United States Patent [19]
Fetner et al.

[11] 3,833,796
[45] Sept. 3, 1974

[54] METHOD AND APPARATUS FOR CHROMOSOME DIGITIZING

[75] Inventors: Robert H. Fetner; John C. Alderman, Jr., both of Atlanta, Ga.

[73] Assignee: Georgia Tech Research Institute, Atlanta, Ga.

[22] Filed: Oct. 13, 1971

[21] Appl. No.: 188,716

[52] U.S. Cl. ........ 235/151.3, 128/2 R, 340/146.3 R, 340/146.3 AC, 356/39, 178/DIG. 22, 444/1
[51] Int. Cl. ............................................ G06f 15/42
[58] Field of Search ......... 73/432 PS; 128/1 R, 2 R; 235/151.3; 340/146.3 R, 146.3 AC; 356/39; 178/DIG. 22; 444/1

[56] References Cited
OTHER PUBLICATIONS

Golab, T. J., MACDAC–An Inexpensive and Complete Biomedical Input and Output Display System, In Proc. 23rd ACEMB: p. 23.5, Nov. 1970.
Neurath, P. W. et al., Interactive Computer–Aided Chromosome Analysis, In J. Assoc. Advan. Medical Inst. 4(1): p. 6–14, Jan.–Feb. 1970.
Pence, G., MACDACSYS–A Programming System for Manual Assist to Automatic Chromosome Analysis, In Proc. 23rd ACEMB: p. 261, Nov. 1970.
Pelster, D. R., System for Semi-Automated Chromosome Analysis, In Proc. 23rd ACEMB: p. 268, Nov. 1970.
Ledley, R. et al., Optical and Electro–Optical Information Processing Silver Spring, Md. Nat. Biomed. Res. Found., 1965, p. 591–613.

*Primary Examiner*—Malcolm A. Morrison
*Assistant Examiner*—R. Stephen Dildine, Jr.
*Attorney, Agent, or Firm*—Newton, Hopkins & Ormsby

[57] ABSTRACT

A chromatizer including an apparatus for and method of effecting the analysis of chromosomes including means for establishing an image of at least one chromosome, means for digitizing the distance each arm of the chromosome is from a preselected reference point, and means for automatically computing a number of quantitative measurements of the chromosome, including the length of each arm and the centromere index. The digitizing means includes means for identifying and recording the location of a plurality of points along each arm of the chromosome relative to the reference point. The establishing means includes means for superimposing the identifying means onto the image of the chromosome. The computing means includes means for displaying the computed quantitative measurements.

14 Claims, 8 Drawing Figures

INVENTORS:
ROBERT H. FETNER
JOHN C. ALDERMAN, JR.
BY: Newton, Hopkins, & Ormsby
ATTORNEYS

METHOD AND APPARATUS FOR CHROMOSOME DIGITIZING

BACKGROUND OF THE INVENTION

In the past few years, there has been a dramatic increase in the interest of the medical community with human cytogenetics. This interest has been generated by the demonstrated relationship between chromosome abnormalities and human pathology, and there is the expectation that this discipline will provide an even better understanding of the human organism At the present state of the art, human cytogenetic studies begin with a karyotype analysis of an individual. The individual chromosomes are characterized primarily by two parameters: length of the individual chromosomes and location of the centromere. The homologous pairs of chromosomes are separated from one another or placed into similar groups on the basis of these two parameters. This analysis sometimes uses other distinguishing chromosome features, such as satellites and secondary constrictions; however, these are either not universally present or may not be distinguishable. The use of radioisotope tagging to determine the time of nucleic acid synthesis, which differs among the chromosomes, and the selective staining of specific parts of different chromosomes with fluorescent compounds are recent developments.

At present, the commonly used distinguishing characteristics of the individual chromosome, length and centromere index, are usually determined qualitatively by visual inspection of chromosome pictures cut from a photographic print. There are a number of shortcomings in such an analysis. It uses photographic prints in which there is a loss in resolution from the original microscope image and, at high magnification, the microscope has a very limited depth of focus. The dependence upon the human eye for quantitative discrimination is another serious fault.

It would be highly desirable to quantitate the chromosome parameters directly under the microscope. This would permit the separation of the chromosomes with greater precision. One of the most useful methods of karyotype analysis is to graph the relative length vs. the centromere index (centromere index, CMI, is the ratio of the length of the short arm to the total length of the chromosome) for all the chormosomes of the karyotype. To accomplish this, it is necessary to measure the lengths of both pairs of arms of each chromosome, from which may be determined:

1. the relative length (i.e., the length of one chromosome relative to that of a female haploid set); and
2. the centromere index. This kind of analysis requires a quantitation of the chromosome arm lengths.

In the past, a common method for measuring chromosome length has been to bend fine wire or string along photographic images of individual chromosomes and then subsequently measure the straightened material. This is obviously a very time consuming process. Other attempts at quantitation have involved area measurements with a planimeter or weighing cut-outs of individual chromosomes from photographic prints.

It is obvious that these relatively unsophisticated methods leave much to be desired for widespread usage. The other extreme in technological sophistication can be seen in a recently developed automated karyotyping system which involves an automated microscope to scan a prepared slide until the technician sees a group of suitable chromosomes and stops the scanner. The system then takes over, automatically sharpening the focus and enlarging the image a great number of times. A special data camera takes a picture of the chromosomes and transfers their nuclear images into a computer. The computer isolates, measures, and rotates each chromosome image until it is erect. The chromosome images are then numbered, classified, paired, and arranged in a customary karyogram. The resulting digital picture inside the computer is transferred to a photographic printer which turns out a picture of the karyogram on paper.

This method of chromosome characterization has attempted to replace the human's pattern recognition facilities with an automatic system which performs the same function. In doing so, the system reduces the chromosome image on the slide to the photographic form so that, as in the previously discussed manual method of chromosome analysis, the accuracy of the analysis is diminished by the loss of resolution in going from the "raw" image of chromosomes on the slide to the photographic image. Also, this automatic karyotyping method, for all its sophistication, does not produce quantitative data, such as the length of the chromosome arm, etc. All the system does is automatically prepare a karyogram. A quantitative measurement of the chromosomes in the karyogram would still have to be manually performed. A final serious drawback to the automatic system is that it is very expensive.

SUMMARY OF THE INVENTION

Briefly described, the present invention includes an apparatus for and a method of characterizing chromosomes which provide means for obtaining an image of at least one chromosome, means for converting the points along each of the arms of the chromosome into data form, and means for automatically computing various quantitative measurements for the chromosome, including the length of each arm and the centromere index.

It is, therefore, a primary object of this invention to provide an apparatus for and a method of effecting the analysis of chromosomes which automatically provide quantitative measurements of the same.

It is a further object of this invention to provide an apparatus for and a method of effecting the analysis of chromosomes which do not require personnel trained in the chromosome art to perform the analysis.

It is another object of this invention to provide an apparatus for the characterization of chromosomes which can be performed from a microscopic image of the chromosome and which does not require a photographic image of the chromosome.

It is still a further object of this invention to provide an apparatus for the rapid analysis of chromosomes that visually displays the computed quantitative measurements of the chromosomes.

Another object of this invention is to provide an apparatus for the analysis of chromosomes which is compact in design, simple in construction and use, economical to manufacture, automatic in its operation, and which is accurate and reliable.

A further object of this invention is to provide a means for automatically determining, from an image of a chromosome, a selected dimension of the chromosome by automatically sensing a plurality of points on the chromosome to develope coordinate relationships of the selected dimension.

Still other objects and advantages of the present invention will become apparent after reading the accompanying description of the selected illustrative embodiment of the invention with reference to the attached drawings wherein like reference characters have been used to refer to the like parts throughout the figures of drawings, and wherein:

BRIEF DESCRIPTION OF THE FIGURES OF DRAWINGS

DESCRIPTION OF THE INVENTION

Figure 1:
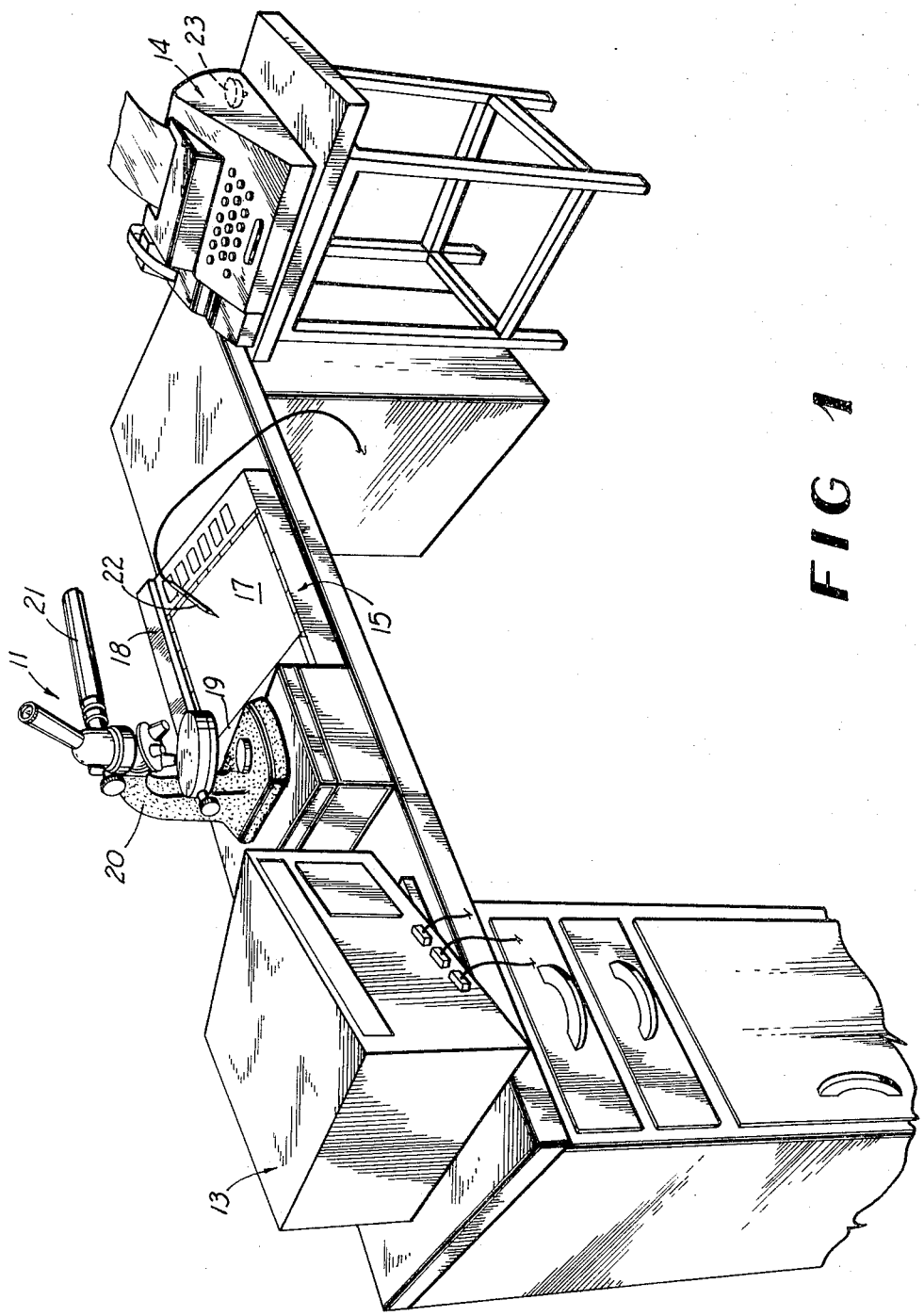
FIG. 1 is a perspective view of the chromosome digitizing apparatus.

Referring now to the embodiment chosen for the purpose of illustrating the present invention, numeral 10 denotes generally the chromosome digitizing apparatus as depicted in FIG. 1.

The apparatus 10 is composed of essentially four basic components: chromosome display means 11, identifying means 12, control instrument 13, and an Input-Output (I/O) means 14.

Figure 2:
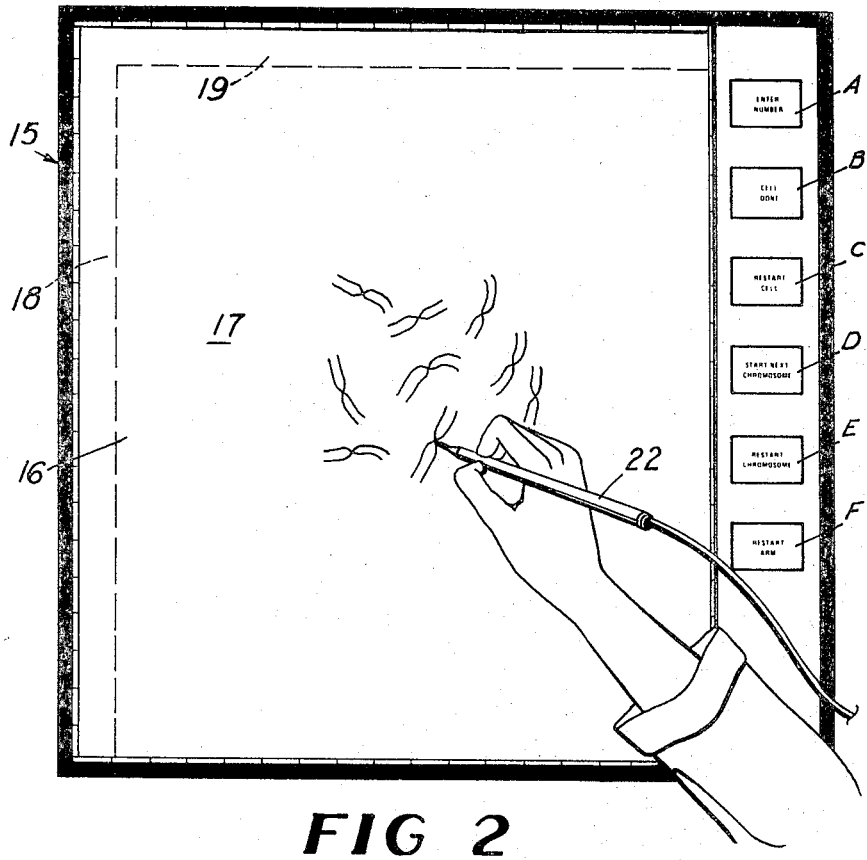
FIG. 2 is a top plan view of the digitizing surface.
Figure 3:
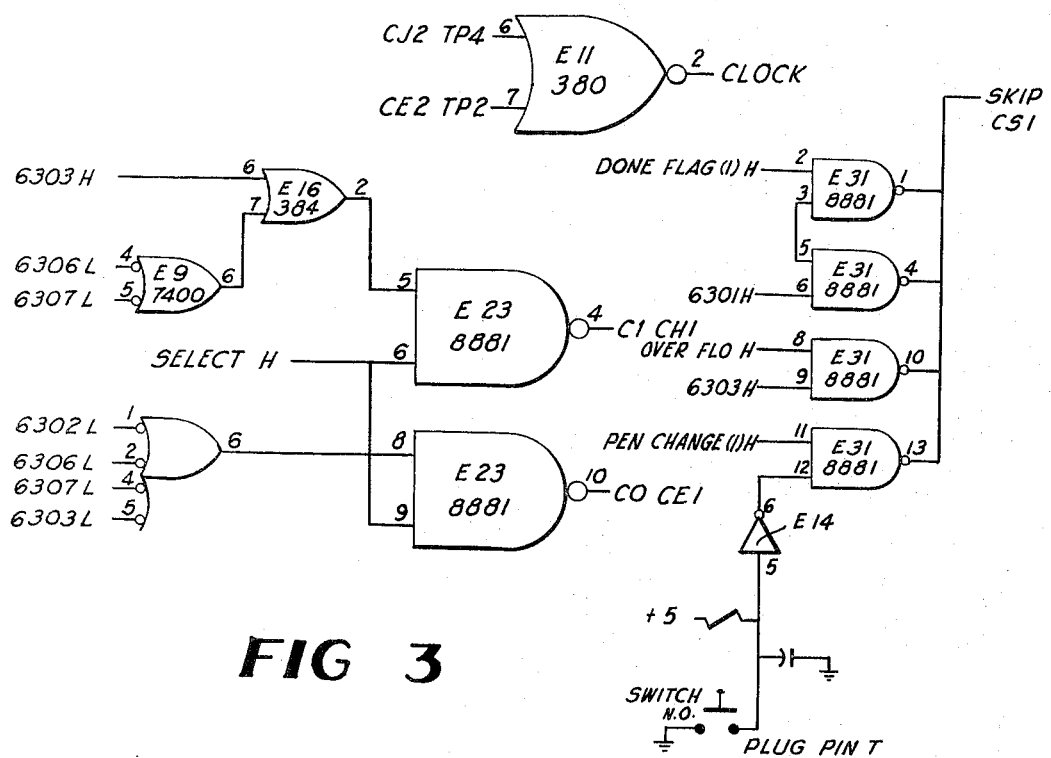
FIG. 3 is a logic schematic of the skip and data control.
Figure 4:
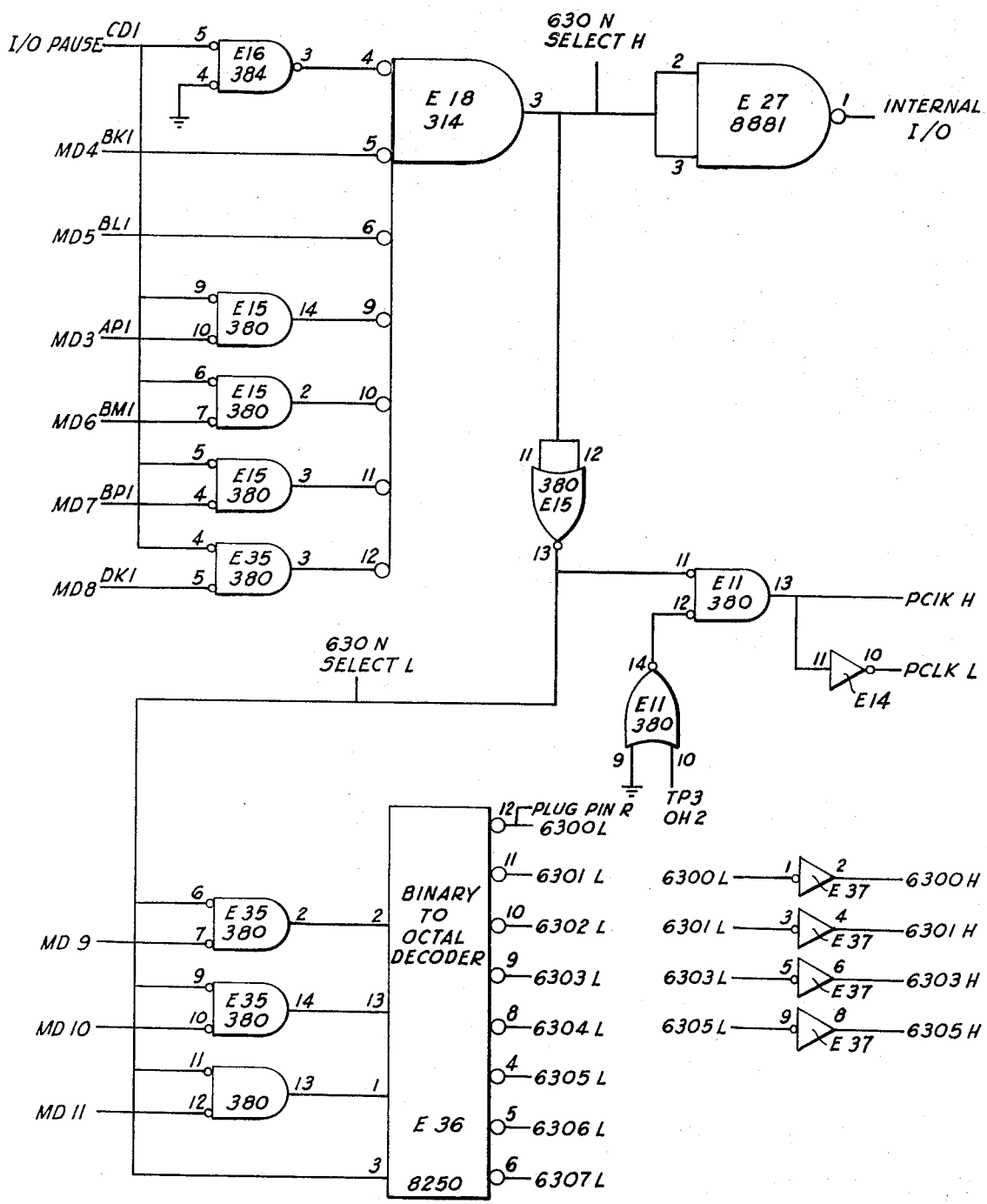
FIG. 4 is a logic schematic of the device selector.
Figure 5:
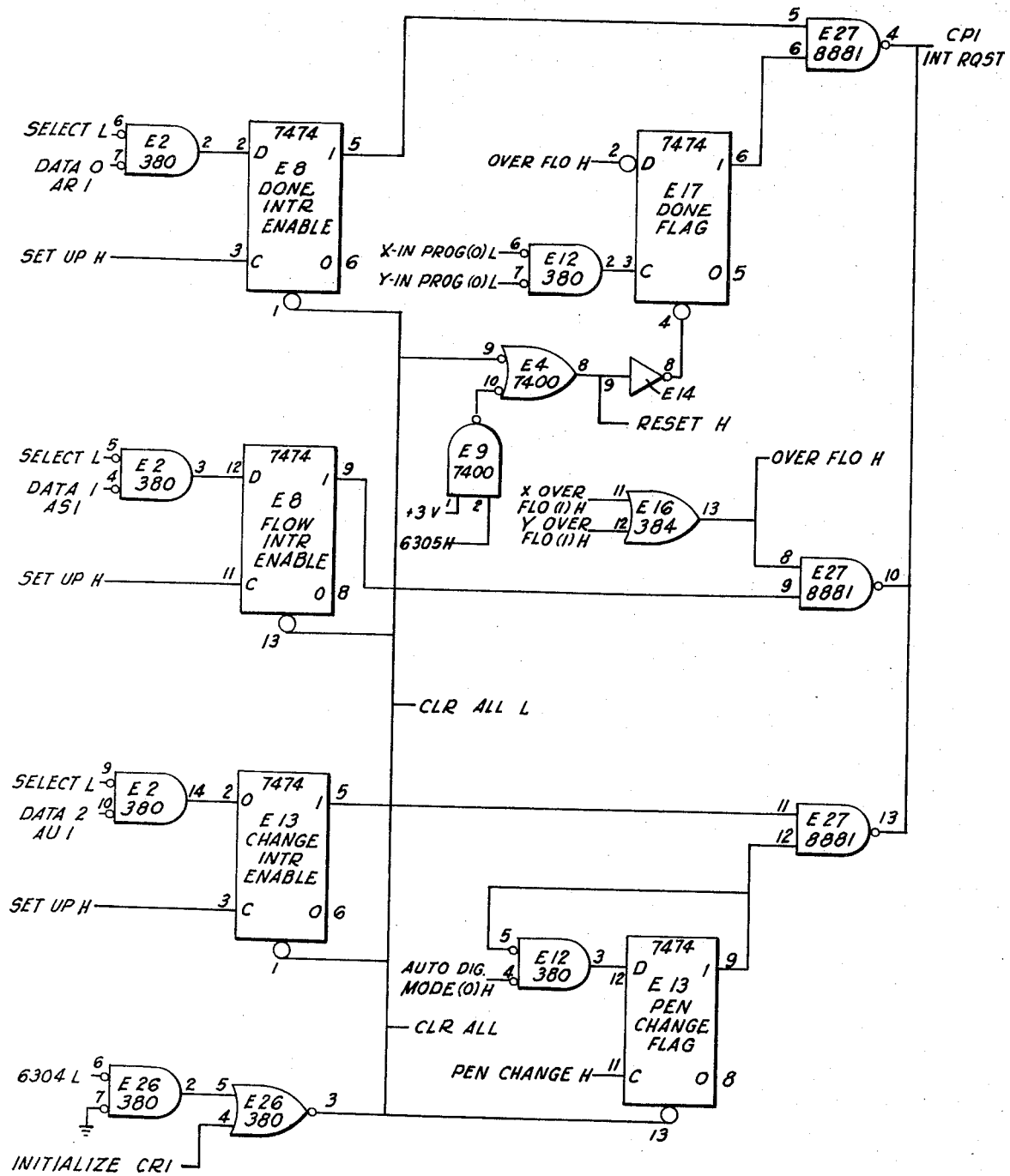
FIG. 5 is a logic schematic of the flags and interrupt enable.
Figure 6:
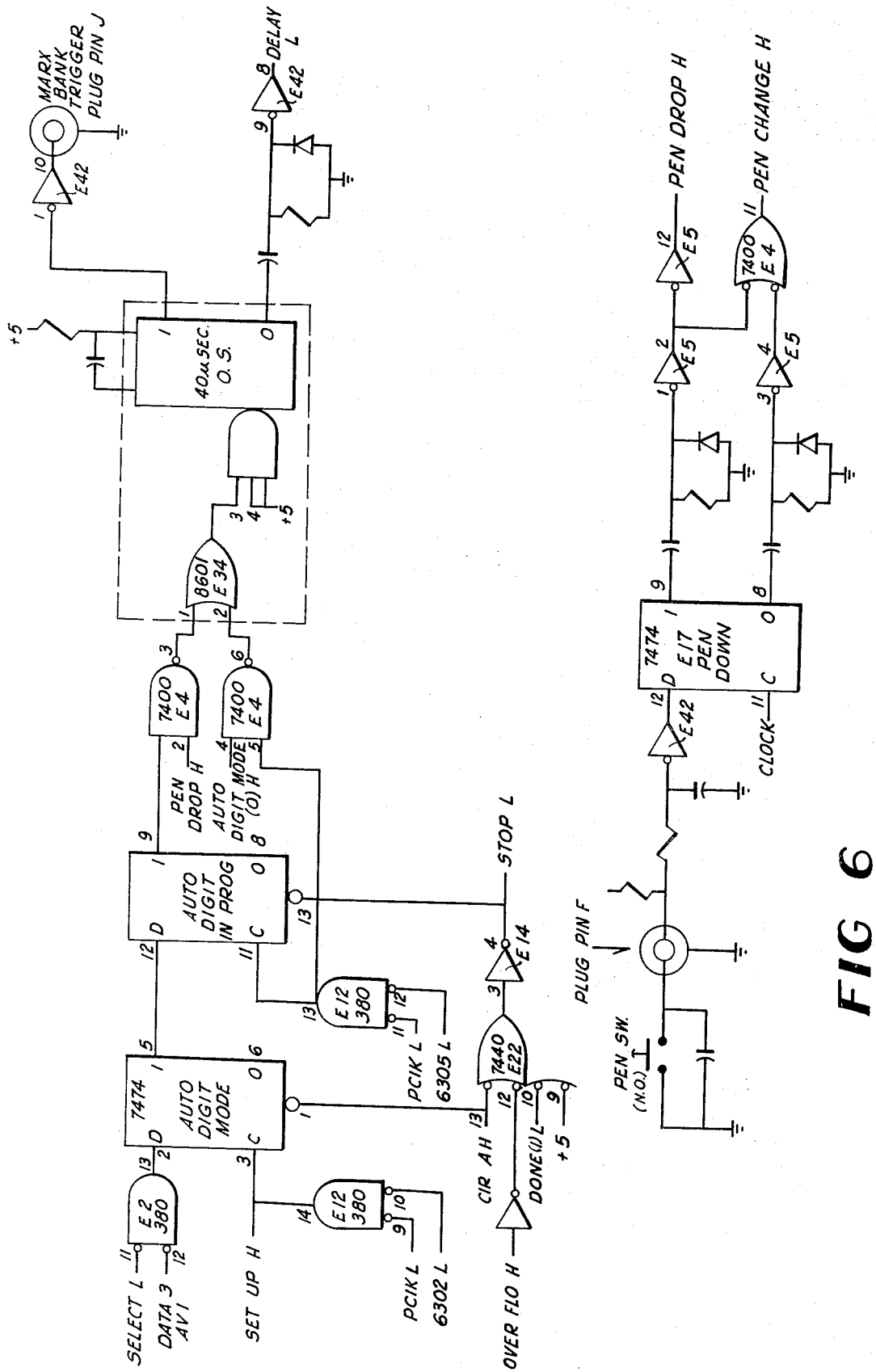
FIG. 6 is a logic schematic of the mode control and initialization.
Figure 7A:
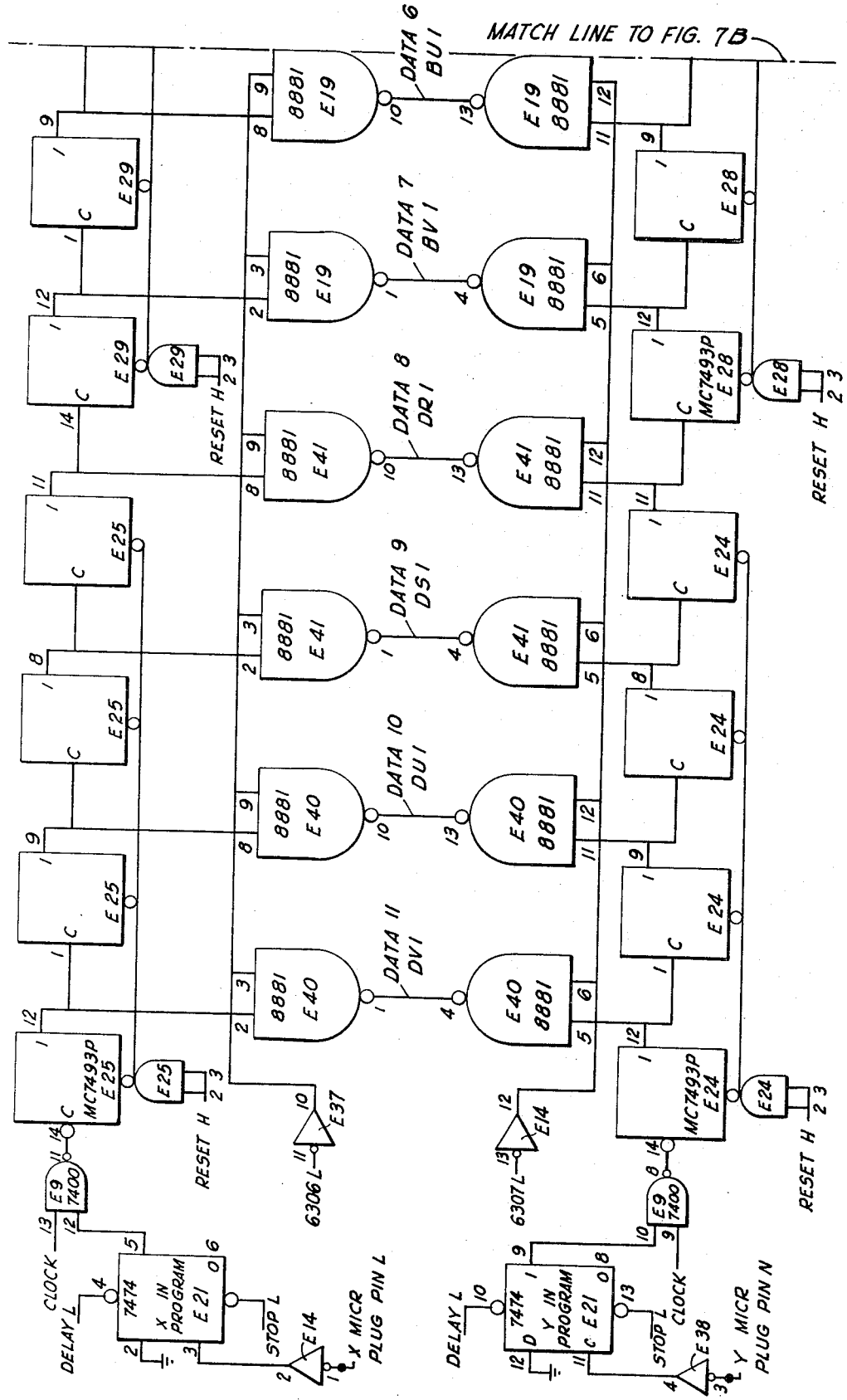
FIG. 7A is a logic schematic of the X and Y scalers.
Figure 7B:
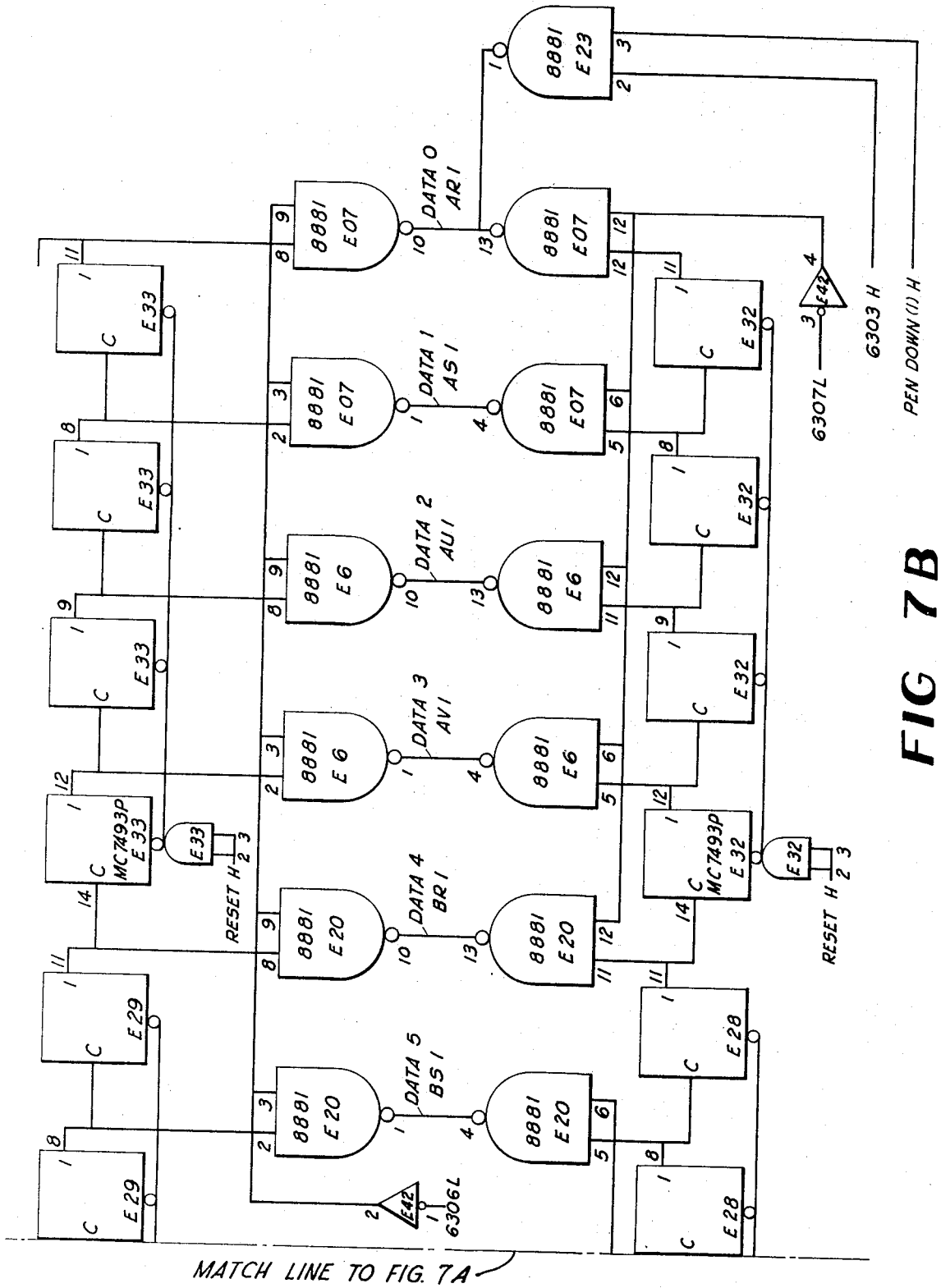
FIG. 7B is a logic schematic of the X and Y scalers taken along the match line in FIG. 7A.

As shown in FIGS. 1 and 2, the display means 11 includes a digitizing table 15 which comprises a digitizing tablet 16 having a flat glass surface 17 with at least two sides, a first sensing means 18 adjacent one of the sides and a second sensing means 19 adjacent an adjoining side. The sensing means 18 and 19 are microphones which can detect the sound of a spark generated by the identifying means 12 over the surface 17. The table 15 also includes means (not shown) for illuminating from below the surface 17. As seen in FIG. 2, to the right on surface 17 appear the following labeled squares: ENTER NUMBER, CELL DONE, RESTART CELL, START NEXT CHROMOSOME, RESTART CHROMOSOME and RESTART ARM, numbered A, B, C, D, E and F, respectively.

A means for obtaining or forming the image of at least one chromosome includes an ordinary high power microscope 20 preferably a phase-contrast microscope into which is inserted a prepared slide containing the particular chromosome or chromosomes to be analyzed. Typically, magnifications of 1,500 diameters are required to amplify the images to visual size.

The preferred method of displaying the chromosome image is to superimpose the surface 17 and the identifying means 12 onto the plane of the chromosome image within the microscope. This is accomplished by such devices as a drawing tube or a camera ludica attachment 21 to the microscope 20.

Also, the chromosome analysis accomplished by the apparatus 10 could be performed just as well from a negative or a microphotograph of the chromosomes which was placed on the surface 17 and illuminated from below. However, some resolution is lost in the transfer of the optical image to the photographic form, but the ease of the analysis is increased with the photomicrograph as compared to the use of the optical image because the need for superimposing the chromosome image in the microscope is eliminated and the operator does not have to manipulate a microscope 20 to observe the image.

Another method of displaying the chromosome image is to substitute a television camera for the eyepiece of the microscope 20. The image will then be shown or displayed on a television monitor, the screen surface of which can be utilized as a digitizing surface by the placement of two adjoining microphones on the sides of the monitor screen.

Whatever display method is employed, the basic concept is the overlaying of the image of the chromosome with the identifying means 12.

The identifying means 12 has two major functions:

1. to select an action to be undertaken by the control instrument 13 (via the labeled squares on surface 17); and
2. to select and digitize the coordinate position of a chromosome and the length of its arms. The identifying means 12 includes a pen 22 which is capable of producing a spark when applied to surface 17. The combination of the pen 22 and the tablet 15 form a spacial coordinate measuring means. A switch contact closure (not shown) within the body of the pen 22 is connected to the control instrument 13 so that each depression of the pen 22 upon the surface 17 is recognized and detected by the control instrument 13.

The control instrument 13 is used for data acquisition and reduction and is essentially divided into three main components: the pen digitizer, the interface and the computer. The pen digitizer is the means for digitizing points along the chromatid arm, recording the position of the points relative to a reference point and converting this analog data to digital form.

The interface allows the computer to control the digitization process and read data from it. The interface is highly dependent upon both the characteristics of the pen 22 and the computer. It is preferable to make the interface and much of the electronics involved in the pen digitizer as a plug-in module to be installed in the computer mainframe.

The computer controls the pen digitizer and performs calculations on the data acquired by the digitizer. It also prepares the data output for the operator.

The I/O device 14 is depcited in FIG. 1 as a Teletype, a registered trademark of the Teletype Corporation machine which is connected to the control instrument 13. A bell 23 is in the housing of the device 14. The I/O device 14 is used by the operator to control the instrument 13 and is used by the control instrument 13 to signal an output data to the operator.

OPERATION

The first step in the operation of the apparatus 10 is that the power switch on the I/O device 14 be placed in the "Line" position and that the control instrument 13 have its power switch in the "On" position. The I/O device 14 will then type out a number of line-feeds, a page origin (two dashes), some more line-feeds, followed by the message "PRESS RED AND BEGIN" and a carriage return. The message will be described hereinafter.

The next step of the chromosome digitizing procedure is to form an image of the chromosome or chromosomes. A human blood cell with 46 chromosomes will be used in this description, but it is understood, of course, that the method and apparatus of the present invention can be effectively utilized for the analysis of any type of chromosome.

The chromosome image is usually formed in a microscope 20, as shown in FIG. 1. This image is viewed as a superimposition of the image of the digitizing means 17 on the plane of the chromosome image within the microscope 20.

To have the surface 17 superimposed on the plane of the image within microscope 20, the operator peers through the eyepiece while having one hand holding the pen 22 poised over the surface 17. The image of the tablet 16, including surface 17 and the labeled squares A–F, plus the operator's hand holding pen 22 are superimposed onto the chromosome image by means of attachment 21. Thus, the operator will see essentially the same view as FIG. 2 when looking through the eyepiece. Surface 17 and the pen 22 then appear as superimposed on the chromosome image. Since the lettering within the squares labeled ENTER NUMBER, etc. will be too small to be read through the microscope optical system, each labeled square is of a different color, thus providing a visual clue for the selection of the appropriately labeled square. The RESTART CELL square is colored red so that the initial message typed by the I/O device 14 ("PRESS RED AND BEGIN") is designed to tell the operator that the apparatus 10 is ready to start its measurement cycle upon his depression of pen 22 in the red or RESTART CELL square. This square will initialize the system to accept the beginning measurements of a cell.

If the image is superimposed on the surface 17, external to the microscope, the operator does not have to be concerned any further with the microscope 20. Regardless of how the image appears, though, the operator must adjust the image so that the individual chromosomes do not appear within the marked-off squares on the surface 17.

After the "red" square has been depressed, the operator should then select a chromosome from the spread under the microscope 20. The scheme for selecting chromosomes in a systematic way will vary with the particular operator, but one popular scheme is to measure from the top left-hand corner of the spread toward the right-hand corner (similar to the way the eye reads a book). The order really doesn't matter as long as it is consistent within a single cell and each chromosome is measured once and only once.

In order to measure the length of the chromosome arms, some reference point is determined. The preferred reference point is the centromere, with all other points on the chromosome being measured relative to that point.

Once the image is in position, the actual measurement of an individual chromosome is initiated by touching the pen 23 to the centromere of that chromosome. An audible spark is produced by the pen 22 which is picked up by the microphones 18 and 19. The switch contact closure in the pen 22 informs the control instrument 13 that the pen 22 is depressed on surface 17. The control instrument 13, having detected the pen-down condition, causes the pen digitizer to record the X and Y coordinates as indicated. Since the speed of sound through air is known, the microphones 18 and 19 sense how long it takes for the sound of the spark to travel through the air from the point of the pen depression. The pen digitizer is then able to convert this time into X and Y coordinates relative to the edges of the surface 17 where the microphones 18 and 19 are located.

The control instrument 13 acknowledges the initial point by signaling the operator. This signaling can be accomplished by a visual signal, such as a flashing light, or an audible signal, such as bell 23 in the I/O device 14. It is preferred that the signal be audible so that the operator does not have to look up from the chromosome image to see if the initial point and subsequent points were registered which is desired for rapid operation. When the centromere is touched by the pen 22, the bell 23 in the I/O device 14 will ring twice and then print three sets of numbers, being, respectively, the chromosome number, the X-axis centromere coordinate and the Y-axis centromere coordinate. A chromosome number is assigned by the I/O device 14 to each chromosome measured. The X and Y axis coordinates are in arbitrary "tablet" units, and are provided mainly so that the operator can check that a chromosome is not being measured twice, since these two coordinates will be unique for each chromosome of the spread (provided that the relative position of the surface 17 and the microscope 20 are not changed during the measurement process).

Starting at the distal point of one chromatid arm, the pen 22 is moved point-by-point along the arm toward the centromere. Thus, the operator may plot straight line segments along the observed "middle" of the chromosome arm being measured, and the control instrument 13 will be able to read the X and Y coordinate of each of the points indicated by depression of the pen 22. The bell is sounded once as each point is accepted by the control instrument 13. The computer is provided with means for storing the location of the points relative to the reference point, the centromere. The distance between the points is accumulated as the length along the chromatid arm, until the operator comes within the "radius of closure" around the centromere (as it was originally defined), at which time bell 23 will ring twice informing the operator that the effective length of the chromatid arm has been measured. The value of the centromere point is used in computing the distance from the next-to-last point on the chromosome arm, so that the operator does not need to "find" the centromere exactly in order to obtain an accurate measurement. The sum of the distance between the points over the length of an arm is the "arm length," and the I/O device 14 will print out this length in arbitrary tablet units.

The sister chromatid arm (i.e. the arm that is most like the one just measured) is measured in the same fashion as above (starting at the distal point and moving the pen 23 along the arm until the centromere is reached). The other two arms are measured with the I/O device 14 printing out the length of the arm after each measurement.

When all four arms have been measured, the I/O device 14 will print the sum of the lengths of the arms as measured and the message "NEXT TASK" and wait for the operator to select a labeled square on surface 17. At this time, the operator should inspect the numbers printed on this line, which would look something like this:

| 1 | 490 | 1099 | 66 | 65 | 57 | 51 | 239 | NEXT TASK |
|---|---|---|---|---|---|---|---|---|
| (chromosome number) | (X axis cent. coord.) | (Y axis cent. coord.) | (1st arm) | (2nd arm) | (3rd arm) | (4th arm) | (Sum of lengths) | |

If these arm lengths appear to be reasonable (i.e. the first two arms nearly alike and the second two arms nearly alike), then the operator would select the square labeled START NEXT CHROMOSOME. This would cause the message "OK" to be printed indicating the operator's acceptance of the data so far and that the next chromosome is ready to be measured. The number for the next chromosome will be advanced automatically by the depression of the START NEXT CHROMOSOME square so that the operator will not have to specify the chromosome number explicitly.

When the final chromosome within the spread has been measured, the operator should depress the CELL DONE square with the pen 22, which will cause the stored data to be printed out in the following summary format:

NO                CMI                RL

"NO" is the chromosome number, "CMI" is the centromere index (the ratio of the length of the shortest arm of a chromosome to the sum of the length of all the arms for that chromosome), and "RL" is the ratio of the relative length of each chromosome to the length of the longest chromosome (in percent). The CMI ranges from 0.5 to 1.0 and the longest chromosome will have a "RL" of 100.0.

This table of data is then followed by a data-plot, which uses the teletype as a crude (but effective) grahpical plotter. The X-axis is the "CMI" and the Y-axis is the "RL." The character "1" is printed for each chromosome in this plot, except when more than one point may lie "on top" of each other, in which case the character "2" or "3" will be printed, indicating the situation. Note that the axes are labeled in the same units as the listing of the summary data above, so it is easy to locate a particular chromosome in the data-aquisition listing (generated when the measurements were made), in the data-summary, and in the data plot. Thus, the operator can check the quality of the measurements by inspecting the printout from the I/O device 14. This permanent record may then be removed from the I/O device 14 and used for subsequent analysis of possible genetic abnormalities.

A further step that may be accomplished by the I/O device 14 is the computation of the errors in measurement of the chromosomes and the fitting of the position of the chromosomes to the known positions within groups, thus producing a graph with all of the "normal" chromosomes removed, and only the abnormal ones remaining. This would be particularly useful in mass chromosome genetic studies undertaken on the general populace.

ERROR RECOVERY PROCEDURES

Much of the utility of the approach to measurements of chromosome morphology of the present invention lies in the interactive ability of the operator to correct his mistakes before they are propogated into other forms. Thus, most of the squares on the surface 17 are associated with correction of operator-detected errors in the measurement process. The apparatus 10 makes essentially no checks on the data as acquired, but provides the operator with very complete information on the process of measurements as they are made.

It is helpful to consider errors of the most common variety first. Usually, the operator will find that he has made some sort of error in "picking" a point along the chromosome arm as he moves the pen 22 toward the centromere. This is easily corrected by depressing the square marked RESTART ARM with the pen 22. This will cause the control instrument 13 to cancel any of the points measured so far along the present arm. The I/O 14 will retype the information up to the end of the measurement of the previous arm on the next line, and wait for the operator to again select the distal end of the present arm, moving back along it toward the centromere as he goes. Note that the RESTART ARM square works even after the operator has "found" the centromere at the end of measuring the current arm. Thus, it is possible to correct a measurement of an arm if an error has been detected, at any time up to the time the next arm is selected (by picking its distal point).

The next most common error for the operator to find some error in the results after an entire chromosome has been measured and is waiting for instructions (NEXT TASK message has been printed). The operator can simply pick the RESTART CHROMOSOME square to cause the present chromosome measurement to be aborted. The control instrument 13 is now ready to re-define the centromere. Note that the RESTART CHROMOSOME square may be selected at any time during a chromosome measurement.

Usually, the operator will detect errors in measuring the chromosome before he goes to the next chromosome. However, the apparatus 10 does allow the operator to remeasure any chromosome(s) at random. This feature is selected by picking the ENTER NUMBER square on the surface 17. The user must then type in on the keyboard of I/O 14 the number of the chromosome to be measured (restricted to 1–50), followed by striking the "return" key. At this time, the instrument 13 is setup to measure the specific chromosome (or re-measure it, if required) via the definition of the centromere by the operator. Note that the centromere definition coordinates are helpful in determining the chromosome to be re-measured in the spread. If the operator makes a typing error before striking the "return" key, he may delete all that has been typed by holding the key marked "CTRL" down, and pressing the "O" (letter 0) key, which will cause a backarrow ( ← ) to be printed.

Also note that the ENTER NUMBER square selects the chromosome to be re-measured strictly by user-provided number. The user should return to the sequence of measurements via the ENTER NUMBER square, when finished correcting the chromosomes that were just re-measured.

The rare situation will sometimes exist in which a chromosome will have one or more arms completely missing. In this situation, the operator can just pick the centromere immediately which will indicate to the instrument 13 a zero length for that arm. Thus, regardless of whether one or more arms is missing, the centromere must be picked four times for each chromosome measured.

Sometimes the operator will determine that the whole measurement process needs to be restarted (for example, a cell has been selected for measurement that is not suitable). In this case depressing the RESTART CELL square will abort the measurements so far recorded for that cell and allow the operator to restart on a new cell.

There are a number of I/O devices 14 that can be utilized to improve the operation of the system, but they are not essential and are of the nature of frills. The first is an oscilloscope which could be used to display the points and straight line segments between them as they are plotted by the operator. The face of the scope could also be used in place of surface 17 and thus could be superimposed upon the chromosome image which would facilitate the measurement process considerably. This feature is one that would be considered for systems where precision performance is of the utmost importance, and the cost is secondary.

A further embodiment of the display means 11 would be to replace the eyepiece of microscope 20 with a television camera. The image would be viewed on the screen of a television monitor, the screen surface serving as a digitizing surface by the placement of microphones (such as microphones 18 & 19) on adjacent sides of the screen. The operator would then not have to peer through the microscope and there would be no need for the superimposing of any images.

Another I/O device 14 which could be used is a digital (or analog) plotter which could considerably improve the appearance of the output graph, but it would not increase the precision of the plotting, since the data limits the precision.

Another extra item could be additional storage means (such as magnetic tape) for the computer which would make further analysis and comparisons of measurements much easier, since the data would then be stored in a form convenient for calculation.

The most important feature of the present invention is that the operator is called upon to make all of the decisions concerning the measurements. The apparatus 10 is designed to relieve the operator of the tedium of the measurement process, but it does not make any decision as to what is being measured. The apparatus 10 is unique both in its reliance upon the operator's ability to recognize the chromosome patterns and its extremely low cost. In essence, the apparatus 10 provides the quantative ability, while the operator provides the qualitative ability, and together they make a team with high performance and low cost which is feasible to introduce into the laboratory. The process of measuring the chromosomes is not radically different from the present laboratory procedures, and thus the training and familiarization cost for user personnel is also minimized.

DETAILED DESCRIPTION OF CHROMATIZING APPARATUS

The following is a detailed description of the various elements of the chromatizing apparatus 10, including the computer, the interface, and the computer program. The brand name, the model number and manufacturer source for these particular elements are mentioned in the following as the operation of apparatus 10 is highly dependent upon what type of components are utilized therein.

COMPUTER

The computer used in this embodiment is a Digital Equipment Corporation (D.E.C.) PDP8/E-AA with teletype and teletype control module, hardward boot strap module and chromosome digitizer interface module. The chromosome digitizer interface module plugs into the omnibus of the PDP8/E-AA exactly like all of the other omnibus processor options made by D.E.C. The omnibus is fully explained in the 1971 edition of the "Small Computer Handbook," published by D.E.C.

The preamplifier for microphones and Marx-Bank spark generator are purchased items from Science Accessories Corp. and are mounted on a plate in place of the second omnibus inside the PDP8/E-AA processor, and derive power from the PDP8/E-AA power supply.

Front Panel

The front panel for the instrument 13 has two controls and a light. The controls are a three position key-operated master power switch. The left OFF position of this switch disables all power to the computer. The middle POWER ON position enables power to the power ON-OFF switch, the right position enables computer power and automatically starts the hardward boot strap loader into operation for loading program tapes via the teletype paper tape reader. There is another switch labeled "Power-on-off" which is used by the operators. In normal operation, it is in series with the center and right position of the master keylock power switch. In the ON position, the computer power is enabled; in the OFF position, the computer powers down for later turn-on.

When the computer power is removed by either of the power switches, or external events, the hardware power fail option of the precessor detects the power "low" condition, and saves the contents of the active registers in magnetic core (which is non-volatile) for later restoration when the power is restored. The two-position toggle-type power switch will normally be operated by users to turn the unit ON and OFF. When the unit is turned ON, the program will take action to reinitialize the system for normal operation. When the power is enabled, a power light on the front panel is illuminated.

CONNECTORS

Teletype

The teletype connector is brought to the rear panel of the chromatizer so that the Teletype may be easily disconnected when moving the instrument. In normal operation, this connector MUST be connected to the teletype.

Marx-Bank Connector

This rear-panel connector is the one used for the pen and carries the signals from the Marx-Bank high-voltage generator to the spark gap of the pen and from the pen microswitch back through the Marx-Band unit to the chromatizer interface.

Microphone Connector

This is a twin co-ax connector which connects the output of the "X" and "Y" microphones to the input of the "X" and "Y" microphone connectors. This connector is also mounted on the rear panel of the chromatizer.

MARX-BANK GENERATOR

This unit contains a 500 volt power supply and five stage Marx-Bank voltage multiplier which is used to generate the very high voltage (but very low energy) spark utilized by the graph pen as a sound source for locating the coordinants of the pen. This unit is manufactured by the Science Accessories Corporation and is a standard card with a number of silicon controlled rectifiers and a proprietary (with SAC) control circuit. Input to this card is 380 volts a.c. RMS but very low current is required. The Marx-Bank is triggered by the negative transition of the Marx-Bank trigger from the chromatizer interface. The maximum rate of this device is 100 pulses per second.

X and Y MICROPHONE PREAMPLIFIERS

The sound pressure wave from the spark is amplified and turned into a negative pulse by the "X" and "Y" microphone preamplifiers. The circuitry in this unit is proprietary to the Science Accessories Corporation, and the unit is a standard production item from them. The outputs of these two preamplifiers clear the "X" and "Y" IN-PROGRESS flip-flops at the end of the digitization cycle.

GRAF-PEN TABLET

The Graf-pen, a registered trademark of the Science Accessories Corporation tablet consists of a 14" square glass surface, two linear microphones along the top and lefthanded edges of the tablet, and the pen containing the spark gap, pen microswitch, and ballpoint pen. These items are catalog items from the Science Accessories Corporation,

W966 PDP8/E INTERFACE BOARD

It is a single module and contains 40 integrated circuits. Referring to FIGS. 3–7B, the interface basically consists of two 12 bit scalers, device selection logic, a four bit command register and the appropriate control circuitry for controlling the digitization process.

Command Structure

The device code 630X where "X" ranges from 0–7, the code used to control the chromatizer interface. The device codes are assigned as follows:

| I.O.T. | MNEMONIC | FUNCTION |
|--------|----------|----------|
| 6300 | GPMS | Skip if maintenance switch enabled |
| 6301 | GPSF | Skip if done or overflow |
| 6302 | GPCR | Function main command register |
| | | ACO (1) Enable interrupt on "Done" |
| | | AC1 (1) Enable interrupt on "Overflow" |
| | | AC2 (1) Enable interrupt on "pen change" |
| | | AC3 (1) Enable Auto Digit Mode |
| 6303 | GPSP | Skip if Pen Changed |
| | | If Pen Up, Acc = $\phi$ |
| | | If Pen Down, Acc = 4000 |
| 6304 | GPCL | Clear All |
| 6305 | PPST | Start Digitization |
| 6303 | GPRX | Read "X" register |
| 6307 | GPRY | Read "Y" register |

The maintenance switch is mounted on the interface board and is used to enable program modifications by maintenance personnel.

Device Selection Logic (Refer to Logic Schematic, FIGS. 3–7B)

The device code selection is accomplished by four SP380, one SP384 and one SP314 gates. They are wired to decode device 630X and when that code is detected by the device selection circuitry, 630N SELECT H is generated. 630N SELECT H will enable the INTERNAL IOT level via the gate at E27. 630N SELECT H is inverted by the gate at E-15 to create 630 N SELECT L which enables MD9, 10 and 11 to select the correct IOT code via the binary-to-octal decoder at E-36. E-36 has eight outputs, each of which are asserted at ground. The device selection code 630N SELECT L is ANDed with an inverted version of TP 3 to create PC1K H and, through an inverter, PCLCK L. These pulses are used elsewhere in the circuitry to enable IOT's. Note that the binary-to-octal decoder is enabled only when 630N SELECT L is true, this inhibits all eight outputs when IOT 630N is not being generated. In order to properly condition lines C-O and C-1, of the OMNIBUS in the PDP8/E it is necessary to select C-O to ground for some of the IOT's used by this device. C-O is grounded when either 6302L, 6306L, 6307L or 6303L are asserted to gate E-22. C-1, is grounded when 6303L or 6306L or 6307L are asserted. The GRAF-PEN Command Register are coded from bits 0, 1, 2 and 3 of the accumulator. Bit 0, enables an interrupt upon completion of the digitization operation (DONE FF = 1). Bit 1, enables INTERUPT-IF-OVERFLOW [either X-OVERFLOW = (1) or Y-OVERFLOW = (1)] occurs and bit 2, enables an interrupt if the pen changes state. (raise or lower) Bit 3, when set, enables the autodigitization mode (see below). The command register is loaded by GPCR (IOT-6302)

When the AUTO-DIGITIZER-MODE flip-flop at (E-3) is not set, the interface is in so-called normal mode. In the normal mode, the start-digitization-signal (IOT 6303) will immediately begin a digitization cycle which consists of a 40 micro-second delay (from E–34) at the end of which the X-IN-PROGRESS and Y-IN-PROGRESS flip-flops are set. Simultaneously, with the start of the initial delay, the spark is generated by the Marx-Bank generator. When pulses arrive from the "X" and "Y" microphone preamplifiers, these flip-flops will be cleared and the "DONE" flag will be set. If either microphone does not recieve a pulse, then over flow (for either "X" or "Y") is detected in which case the "DONE" flag is inhibited but the "OVERFLOW" flag is set. This normal mode of operation may be used for both point-plotting and continuous-curve-following. This mode of operation is not used in the current version of the chromatize but is available in the interface for later usage if required.

Auto-Digitize Mode

When AC Bit 3 and IOT 6302 is generated the autodigitize mode is enabled. In this mode the start of a digitization cycle is inhibited until the user depresses the pen against the tablet at which time the delay is started, the spark is generated, and the digitization cycle is entered. At the end of the digitization cycle "DONE" or "OVERFLOW" will create an interrupt if the appropriate bit of the GPCR is enabled (bits 0 & 1 of the GPCR). When the AUTO-DIGITIZE-MODE is enabled the pen change flag is inhibited (Bit 2 of the GPCR).

Maintenance Switch

IOT, 6300 is used to test the state of a switch labeled MS, this switch is installed in the module containing the digitizer interface. When the switch is closed IOT 6300 will cause a skip. When this switch is enabled the maintenance mode is available to the programmer which means that programs may be changed by striking control "O" on the teletype keyboard. The normal users of this equipment will not have the maintenance switch available to them which means that they cannot make program modifications or changes, a desirable feature in order to prevent mistakes. The pen microswitch is brought onto the interface board via I/O connector Pen "P." After going through a suitable switch filter it comes to the D-gate of the "PEN-DOWN" flip-flop. The "PEN-DOWN" flip-flop is clocked (at the C input) every clock cycle. Thus, the first clock cycle after the pen is depressed against the glass will cause a transistion from 0 to +3 volts at "PEN DOWN" (1). A differentiator (consisting of a 0.0022 micro-farad compacitor and a 350 ohm resistor) will create a pulse at E-5, pin 2, (negative going) at the time the pen is depressed against the glass. "PEN-DROP" H is the inversion of this signal and is used in auto-digitization mode to start a digitization cycle. When the pen rises, another differentiator similar to the one mentioned above, generates a negative going pulse at E-5 pin-4. The negative going pulse at E-5, pin 4 or E-5, pin 5 generates a position going pulse labeled "PEN-CHANGE" H at E-4, pin-11. This is used to clock the "PEN-CHANGE FLAG" to a 1, if it is already in an "0" state, and the auto-digitiz mode is not enabled. Thus, in normal mode the "PEN-CHANGE FLAG" will be set everytime the pen changes from either pen-down, or pen-up state. This flag may create an interrupt if its interrupt is enabled by the flip-flop which may be set by AC Bit 2, and 6302 IOT. Thus, the programmer who is using normal mode can raise an interrupt when the pen changes state and make use of this fact in his program.

Clear All

The "CLEAR ALL" may be generated by INITIALIZE from the OMINBUS or IOT 6304 L. "CLEAR-ALL" clears the three interrupt enable flip-flops, the "PEN-CHANGE FLAG," the "DONE FLAG," the X and Y scalers, the OR GATE at E-22-13 clears the auto-digitize mode, AUTO-DIGITIZATION-IN-PROGRESS and the "X" and "Y" IN-PROGRESS flip-flops. "CLEAR-ALL" may be used at any time to abort and/or inhibit operations of the chromatizer interface.

Skip Line Requests

Skips are requested by DONE-FLAG on a (1) or OVERFLOW H ANDed with 6301 H thus, the IOT-6301 is effectively skip on done or overflow. The skip is also requested for 6303 H and "pen-change" flag on a (1). Skip is also requested for 6300 H and maintenance switch enabled. The four gates that can create the skip condition R on E-31.

Done Flag

The "DONE-FLAG" is set at the end of a digitization operation by the transition of both "X" and "Y" "in-progress" to the zero "0" state. The OVERFLOW H into the D-input of E-17 ("done-flag") will clear the "DONE-FLAG" rather than set it, but an interrupt may still occur if the overflow interrupt is enabled. "OVERFLOW" H is generated at E/16-13 by the condition of either "X" overflow on a (1) H or a "Y" overflow on a (1) H. The done flag is cleared either by "CLEAR-ALL" or IOT 6305 (start digitization mode). If the "done-flag" is up and the done interrupt is enabled (E-18 and 5) then an interrupt request will appear at the omnibus.

Pen-in-Progress Flip-Flops

There are two logically similar flips-flops IN-PROGRESS and Y-IN PROGRESS, these flip-flops are cleared by STOP L which is CLEAR ALL or OVERFLOW HIGH or DONE on a (1) low. They are set at the end of the 40 micro-second delay at the beginning of a digitization cycle. When these flip-flops are set clock pulses accumulate in the 12 Bit "X" and "Y" scalers which continue to accumulate clock pulses until the "X" microphone of "Y" microphone preamplifiers deliver a ground going pulse to the input to the inverters at E-14,, pin 1, and E-38, pin 3. If more than $2048_{10}$ pulses arrive for either "X" or the "Y" scaler, the "X" OVERFLOW on a (1) high or the "Y" OVERFLOW on a (1) high levels will be asserted, which will cause "OVERFLOW" H which will generate "STOP" L via the four input NOR gate at E-22. STOP will clear "X" and "Y" IN-PROGRESS and strobe the inversion of "OVERFLOW" H into the "DONE-FLAG". Thus, the largest number that either the "X" or "Y" scalers may accumulate is $4000_8$. "OVERFLOW" H is normally an error condition and the users program will normally test the content of the "X" and "Y" registers to determine if overflow has occurred.

"X" and "Y" Registers

The "X" and "Y" registers are identical 12 Bit scalers as mentioned above which are reset by RESET HIGH and read into the PDP 08/E accumulator by 6306 L (in the case of the "X" register) or 6307 L (in the case of the "Y" register).

Clock

Since the PDP-8E timing is derived from a 20MHZ crystal clock, TP2 and TP4 are used as the clock for the interface. SP380 at E-11 generates CLOCK whenever TP2 and TP4 is generated by the processor. This has an interesting implication in that when the processor is halted TP2 and TP4 are inhibited and thus, the clock pulses are not generated when the processor is stopped.

Testing the Pen State

The pen microswitch may be tested (at any time) by use of the IOT 6303, which will set AC Bit zero "0" of the accumulator if the pen is down and clear all the other bits of the accumulator is up.

Marx-Bank Trigger

The Marx-Bank trigger is derived from the leading edge of the 40 microsecond initial delay. This delay is used to inhibit the circuitry during the initial Marx-Bank pulse time since the pulse generates large transients in the signals into the interface, which might cause spurious conditions to be detected. It is the negative going transition of the Marx-Bank trigger pulse that creates the spark. At the end of the 40 microsecond delay the pulse at E-46-8 called "DELAY" L is generated which sets the "X" IN-PROGRESS" and "Y" IN-PROGRESS" flip-flops.

Simulation Using IOT 6300

IOT 6300 L is brought to pin R of the I/O plug. This pulse may be umpered to either pin L or pin N of that plug when the normal connection to the "X" and "Y" microphone preamplifier is not made. Thus, the processor may create a dummy "X" and "Y" microphone preamplifier signal which can be used for maintenance purposes. This feature is especially useful when testing the various bits of the "X" and "Y" scaler.

CHROMATIZER PROGRAM

The program for the control instrument 13 consists of 3968 octal numbers, which must be core-resident in a Digital Equipment Corporation PDP8/E-AA. The following "core-dump" is the listing of the numbers in octal format. The leftmost column is the address (also in octal) of the location whose contents is in the second column from the left, and each column from the left is the contents of the next location in core. Any user of a PDP8 could easily devise a program to accept the numbers from the I/O device 14 and place them in the corresponding core locations.

| | | | | | | | | | | |
|---|---|---|---|---|---|---|---|---|---|---|
| 0000 | 3507 | 5473 | 7000 | 7000 | 7000 | 0013 | 0100 | 6600 | 5332 | 5273 |
| 0012 | 6535 | 5576 | 3117 | 0000 | 0000 | 5333 | 0000 | 7715 | 2415 | 5272 |
| 0024 | 0000 | 5272 | 0000 | 5332 | 0000 | 5576 | 0006 | 0261 | 0000 | 5576 |
| 0036 | 0000 | 0215 | 0000 | 0000 | 0000 | 0000 | 0000 | 0000 | 0000 | 0024 |
| 0050 | 0000 | 7003 | 2004 | 7124 | 7735 | 0000 | 0000 | 0000 | 5332 | 0000 |
| 0062 | 0000 | 2676 | 3477 | 4000 | 0215 | 5050 | 0005 | 0215 | 6541 | 2603 |
| 0074 | 0215 | 6536 | 7700 | 0256 | 7701 | 7600 | 7760 | 0177 | 0017 | 0277 |
| 0106 | 7776 | 7477 | 0260 | 7540 | 7522 | 7563 | 7775 | 7773 | 7767 | 0077 |
| 0120 | 0200 | 4000 | 2031 | 2156 | 6115 | 6200 | 6400 | 3140 | 3664 | 3664 |
| 0132 | 2020 | 2415 | 0501 | 0540 | 0511 | 0543 | 0555 | 2264 | 2473 | 1323 |
| 0144 | 0727 | 3307 | 2156 | 2433 | 0301 | 2232 | 2351 | 1562 | 1531 | 1540 |
| 0156 | 2036 | 0752 | 0706 | 2063 | 2726 | 0523 | 0000 | 3046 | 1170 | 5564 |
| 0170 | 7620 | 2556 | 4533 | 4545 | 0754 | 0000 | 2741 | 7610 | 5576 | 1133 |
| 0202 | 3022 | 7001 | 3475 | 3026 | 1031 | 3013 | 1225 | 4545 | 1060 | 3010 |
| 0214 | 3062 | 1060 | 3027 | 4546 | 4543 | 6531 | 2041 | 4542 | 5217 | 0252 |
| 0226 | 4542 | 4542 | 1060 | 3017 | 3020 | 4541 | 1031 | 3013 | 4554 | 4555 |
| 0240 | 5361 | 5270 | 2026 | 4550 | 1121 | 1065 | 7640 | 4562 | 1060 | 3010 |
| 0252 | 3062 | 1067 | 3410 | 4554 | 7410 | 4541 | 4542 | 1066 | 1113 | 7640 |
| 0264 | 5257 | 4561 | 4552 | 5177 | 5671 | 3165 | 1422 | 7450 | 5177 | 3022 |
| 0276 | 1022 | 7001 | 5231 | 0244 | 4554 | 4555 | 7410 | 5770 | 7200 | 3036 |
| 0310 | 4771 | 1047 | 0372 | 1046 | 7640 | 4562 | 1047 | 4553 | 7004 | 3067 |
| 0322 | 4555 | 4541 | 4555 | 5337 | 5351 | 1054 | 7106 | 1054 | 7004 | 1067 |
| 0334 | 3067 | 4541 | 4555 | 4562 | 5351 | 1054 | 1067 | 3067 | 4541 | 4555 |
| 0346 | 5337 | 7410 | 4562 | 7100 | 1067 | 0101 | 7640 | 7020 | 1067 | 0103 |
| 0360 | 7460 | 4562 | 7640 | 1373 | 7020 | 7004 | 3065 | 5701 | 3246 | 6000 |
| 0372 | 7740 | 2000 | 3516 | 3547 | 2015 | 2011 | 3226 | 3400 | 3644 | 3641 |
| 0404 | 3557 | 0240 | 0240 | 0240 | 0240 | 0240 | 0531 | 7240 | 1013 | 0534 |
| 0416 | 7240 | 1013 | 3013 | 5615 | 4550 | 1022 | 4536 | 4537 | 0017 | 4537 |
| 0430 | 0065 | 1065 | 7710 | 5265 | 4551 | 7000 | 1023 | 3011 | 1411 | 4557 |
| 0442 | 4562 | 4534 | 0613 | 4540 | 0065 | 1422 | 7450 | 5273 | 7001 | 3030 |
| 0454 | 1065 | 7740 | 5262 | 1430 | 4557 | 5273 | 1430 | 3067 | 5227 | 4551 |
| 0466 | 4562 | 4534 | 0615 | 4540 | 0065 | 4540 | 0017 | 4563 | 3022 | 5700 |
| 0500 | 0616 | 0272 | 6201 | 7301 | 1301 | 4536 | 1701 | 5341 | 3154 | 0272 |
| 0512 | 6201 | 3413 | 6201 | 1031 | 7141 | 1013 | 7630 | 4562 | 5711 | 0541 |
| 0524 | 3311 | 4215 | 6201 | 1413 | 6201 | 1311 | 3311 | 4215 | 1311 | 5723 |
| 0536 | 1133 | 3022 | 4563 | 3301 | 5701 | 0000 | 7240 | 1743 | 3011 | 2343 |
| 0550 | 4710 | 1411 | 4536 | 4772 | 5743 | 0000 | 7301 | 1755 | 3011 | 2355 |
| 0562 | 4710 | 4563 | 3411 | 7344 | 1011 | 3011 | 4772 | 5755 | 3160 | 2740 |
| 0574 | 0212 | 0217 | 0226 | 1112 | 1153 | 1153 | 2725 | 1102 | 0615 | 0615 |
| 0606 | 0621 | 7472 | 4550 | 4551 | 4562 | 1023 | 3022 | 4541 | 1066 | 1113 |
| 0620 | 7650 | 5535 | 4544 | 1401 | 5215 | 1066 | 0242 | 4536 | 4541 | 4544 |
| 0632 | 1401 | 7410 | 5230 | 4563 | 4543 | 1002 | 0163 | 4562 | 0337 | 4550 |
| 0644 | 2026 | 4551 | 5275 | 1067 | 7640 | 4547 | 4541 | 4545 | 1066 | 1113 |
| 0656 | 7640 | 5252 | 1423 | 7450 | 5277 | 7001 | 3030 | 1065 | 7700 | 1430 |
| 0670 | 4557 | 5301 | 1430 | 3067 | 5245 | 1023 | 5261 | 3026 | 5535 | 1065 |
| 0702 | 7750 | 5277 | 4545 | 5272 | 2373 | 4554 | 4544 | 1767 | 5706 | 1066 |
| 0714 | 2306 | 1207 | 7650 | 5325 | 4555 | 5706 | 7410 | 5706 | 2306 | 2306 |
| 0726 | 5706 | 2164 | 1727 | 3012 | 1412 | 7510 | 5346 | 7041 | 1066 | 7640 |

| | | | | | | | | | | |
|---|---|---|---|---|---|---|---|---|---|---|
| 0740 | 5332 | 1727 | 7040 | 1012 | 3054 | 7410 | 2327 | 2327 | 7300 | 5727 |
| 0752 | 0000 | 0101 | 7041 | 3071 | 1067 | 0101 | 1071 | 7650 | 2352 | 5752 |
| 0764 | 6046 | 1036 | 7640 | 5372 | 4541 | 5764 | 4546 | 4543 | 7176 | 3210 |
| 0776 | 5764 | 1046 | 0615 | 0615 | 0621 | 0323 | 0306 | 0311 | 0304 | 0307 |
| 1010 | 0303 | 0301 | 0324 | 0314 | 0305 | 0327 | 0315 | 0321 | 0322 | 0212 |
| 1022 | 0302 | 0317 | 4560 | 4651 | 5356 | 4652 | 1106 | 3032 | 1045 | 7510 |
| 1034 | 2032 | 7750 | 2032 | 7410 | 5650 | 4543 | 1402 | 7374 | 4541 | 5241 |
| 1046 | 4541 | 5236 | 6515 | 1601 | 2050 | 4534 | 1407 | 4554 | 1066 | 1365 |
| 1060 | 7440 | 4562 | 1030 | 7000 | 7000 | 4536 | 4534 | 1612 | 4563 | 3030 |
| 1072 | 4407 | 6430 | 0000 | 7000 | 4543 | 1402 | 7200 | 4562 | 1030 | 4536 |
| 1104 | 4534 | 1612 | 4543 | 1402 | 7174 | 4562 | 4537 | 2031 | 4534 | 1612 |
| 1116 | 4537 | 2031 | 4537 | 0017 | 4534 | 0615 | 4540 | 0017 | 4540 | 2031 |
| 1130 | 4540 | 3175 | 4563 | 3030 | 4407 | 0430 | 1751 | 6430 | 2522 | 0000 |
| 1142 | 7000 | 1045 | 7740 | 5535 | 1030 | 4536 | 4537 | 3175 | 5316 | 4537 |
| 1154 | 2413 | 5316 | 4563 | 7300 | 5227 | 7000 | 7000 | 7000 | 7000 | 7503 |
| 1166 | 1053 | 1053 | 6512 | 0422 | 0610 | 0621 | 1207 | 1210 | 2725 | 2367 |
| 1200 | 0643 | 1265 | 0177 | 0536 | 2725 | 2725 | 6511 | 7240 | 3056 | 3026 |
| 1212 | 4543 | 1374 | 0172 | 2056 | 5235 | 4534 | 1407 | 1066 | 4536 | 1264 |
| 1224 | 4545 | 2036 | 7001 | 4526 | 7000 | 4563 | 3066 | 5207 | 7000 | 4534 |
| 1236 | 1613 | 4525 | 5210 | 2026 | 4541 | 4543 | 1407 | 0775 | 4545 | 5242 |
| 1250 | 4541 | 4550 | 1067 | 3052 | 5211 | 1074 | 4463 | 7040 | 1074 | 4545 |
| 1262 | 4541 | 5211 | 0272 | 4550 | 4551 | 4562 | 1060 | 3010 | 3062 | 1067 |
| 1274 | 3410 | 1010 | 3027 | 4464 | 3475 | 2026 | 4541 | 4545 | 4543 | 6534 |
| 1306 | 2636 | 4542 | 5302 | 1060 | 7001 | 3010 | 3062 | 4546 | 4543 | 6527 |
| 1320 | 2636 | 4542 | 5315 | 0222 | 7450 | 1066 | 7041 | 3071 | 1723 | 2323 |
| 1332 | 3012 | 1412 | 7510 | 5347 | 1071 | 7640 | 5333 | 1012 | 1723 | 3071 |
| 1344 | 1471 | 3071 | 5471 | 2323 | 7300 | 5723 | 1471 | 3071 | 5471 | 2331 |
| 1356 | 7300 | 5731 | 1310 | 1305 | 2737 | 1317 | 1306 | 0257 | 1302 | 1277 |
| 1370 | 2740 | 1311 | 1300 | 0260 | 1321 | 0245 | 0242 | 0241 | 0243 | 0244 |
| 1402 | 0240 | 0254 | 0273 | 0213 | 0215 | 4560 | 0242 | 0215 | 4562 | 3062 |
| 1414 | 4542 | 4541 | 4544 | 1767 | 5232 | 1066 | 0117 | 1061 | 3061 | 4541 |
| 1426 | 4544 | 1767 | 5232 | 5225 | 4556 | 5243 | 1061 | 3056 | 4730 | 4563 |
| 1440 | 3061 | 5642 | 3601 | 3331 | 1031 | 3030 | 6201 | 1030 | 7161 | 1035 |
| 1452 | 7670 | 5265 | 1430 | 7041 | 1061 | 7650 | 5316 | 1030 | 1070 | 5245 |
| 1464 | 7000 | 1013 | 1005 | 7141 | 1031 | 7620 | 4562 | 1031 | 1115 | 3031 |
| 1476 | 1031 | 3030 | 7000 | 7000 | 1061 | 3430 | 2030 | 1331 | 3430 | 2030 |
| 1510 | 4407 | 0533 | 6430 | 0000 | 7000 | 5535 | 1030 | 3011 | 1411 | 7041 |
| 1522 | 1331 | 7640 | 5261 | 2030 | 2030 | 5535 | 1601 | 0237 | 1066 | 1111 |
| 1534 | 7640 | 5731 | 4541 | 5332 | 0241 | 1066 | 1112 | 7640 | 2340 | 1066 |
| 1546 | 1360 | 3054 | 1054 | 7710 | 5740 | 1066 | 1361 | 7750 | 2340 | 5740 |
| 1560 | 7520 | 7507 | 2551 | 7106 | 7006 | 7006 | 5762 | 1250 | 1241 | 1260 |
| 1572 | 1255 | 3052 | 1262 | 1262 | 0615 | 0615 | 0621 | 0000 | 1054 | 4536 |
| 1604 | 1055 | 4536 | 1056 | 4536 | 1201 | 4536 | 4541 | 3055 | 4560 | 5227 |
| 1616 | 5332 | 5343 | 4534 | 1413 | 4560 | 5244 | 0212 | 0377 | 4562 | 1133 |
| 1630 | 3030 | 1106 | 1054 | 7450 | 5247 | 7001 | 7650 | 5323 | 1054 | 1116 |
| 1642 | 7710 | 5363 | 4556 | 7410 | 4562 | 1054 | 3024 | 1024 | 1116 | 7700 |
| 1654 | 3024 | 1024 | 7041 | 1055 | 7710 | 5310 | 1055 | 7112 | 7012 | 1331 |
| 1666 | 3274 | 1055 | 7640 | 4540 | 0044 | 4407 | 0000 | 6522 | 0000 | 1122 |
| 1700 | 3030 | 1024 | 1055 | 7650 | 5535 | 4563 | 3055 | 5255 | 4556 | 7410 |
| 1712 | 5365 | 1055 | 4536 | 1030 | 3320 | 4537 | 0000 | 1024 | 3055 | 4541 |
| 1724 | 4560 | 5363 | 5332 | 5343 | 5220 | 0430 | 4537 | 0044 | 1122 | 3030 |
| 1736 | 3036 | 4526 | 4540 | 0044 | 5222 | 3056 | 4541 | 4544 | 1767 | 5354 |
| 1750 | 1056 | 7104 | 1066 | 5343 | 4556 | 4562 | 4201 | 4563 | 4543 | 2170 |
| 1762 | 6203 | 4556 | 4562 | 4201 | 4563 | 5532 | 0240 | 0253 | 0255 | 0257 |
| 1774 | 0252 | 0336 | 0250 | 0333 | 0274 | 0251 | 0335 | 0276 | 0254 | 0273 |
| 2006 | 0213 | 0215 | 0275 | 4537 | 2413 | 4540 | 0044 | 1232 | 7710 | 4451 |

| | | | | | | | | | | |
|---|---|---|---|---|---|---|---|---|---|---|
| 2020 | 4407 | 7000 | 6231 | 0000 | 1122 | 3030 | 4250 | 5630 | 1622 | 0000 |
| 2032 | 0000 | 0000 | 0000 | 0003 | 0000 | 1054 | 1116 | 7700 | 5636 | 1054 |
| 2044 | 1115 | 7740 | 2236 | 5636 | 0000 | 4563 | 3055 | 1235 | 4563 | 7041 |
| 2056 | 1054 | 7640 | 4562 | 4541 | 5650 | 0266 | 6002 | 4551 | 5663 | 2026 |
| 2070 | 4541 | 1066 | 1113 | 7640 | 5270 | 1017 | 7040 | 1023 | 3057 | 1127 |
| 2102 | 7041 | 1023 | 7650 | 5177 | 6201 | 1423 | 3425 | 1127 | 3071 | 1471 |
| 2114 | 7450 | 5330 | 3032 | 1023 | 7141 | 1032 | 7630 | 1057 | 1032 | 3471 |
| 2126 | 1032 | 5312 | 7040 | 1023 | 3011 | 1057 | 7040 | 1023 | 3012 | 1057 |
| 2140 | 1060 | 3060 | 1010 | 7040 | 1012 | 3032 | 1010 | 1057 | 3010 | 1412 |
| 2152 | 3411 | 2032 | 5351 | 5264 | 0220 | 4464 | 3066 | 4544 | 1623 | 5756 |
| 2164 | 4770 | 5357 | 4545 | 5756 | 6546 | 0330 | 0331 | 0301 | 0323 | 0311 |
| 2176 | 0321 | 0314 | 0322 | 0303 | 7777 | 0203 | 0337 | 0212 | 0215 | 0001 |
| 2210 | 4546 | 1060 | 4550 | 1060 | 3010 | 4561 | 2023 | 1065 | 7700 | 1423 |
| 2222 | 4557 | 5177 | 1423 | 3067 | 5215 | 1035 | 3031 | 5535 | 2066 | 1127 |
| 2234 | 3025 | 1127 | 3023 | 1023 | 3011 | 1067 | 7141 | 1411 | 7450 | 5256 |
| 2246 | 7630 | 5257 | 1023 | 3025 | 1423 | 7440 | 5236 | 7410 | 2232 | 1023 |
| 2260 | 7001 | 3017 | 3020 | 5632 | 0234 | 4321 | 7710 | 1006 | 1350 | 1066 |
| 2272 | 7450 | 5307 | 1303 | 3066 | 1026 | 1475 | 7650 | 4545 | 5664 | 0337 |
| 2304 | 4321 | 7040 | 5266 | 1026 | 7640 | 5317 | 1475 | 7650 | 7001 | 3475 |
| 2316 | 5265 | 1105 | 5275 | 2305 | 2020 | 5336 | 1021 | 0117 | 3066 | 1066 |
| 2330 | 1100 | 7650 | 5304 | 1066 | 1347 | 5721 | 1417 | 3021 | 7040 | 3020 |
| 2342 | 1021 | 7112 | 7012 | 7012 | 5325 | 7740 | 7641 | 0267 | 6201 | 1425 |
| 2354 | 3460 | 1060 | 3425 | 1061 | 7440 | 3410 | 1010 | 7001 | 3060 | 6201 |
| 2366 | 5751 | 4560 | 5227 | 5212 | 5376 | 1066 | 1107 | 7440 | 4562 | 1131 |
| 2400 | 3060 | 6201 | 3527 | 6201 | 5177 | 1262 | 0621 | 6402 | 0765 | 0765 |
| 2412 | 6450 | 0001 | 2000 | 0000 | 0000 | 0000 | 0000 | 7766 | 1066 | 1232 |
| 2424 | 7640 | 5231 | 4534 | 1612 | 7001 | 5535 | 7524 | 2766 | 1067 | 4553 |
| 2436 | 0117 | 4250 | 1077 | 4545 | 1067 | 4250 | 1347 | 3066 | 4545 | 5633 |
| 2450 | 2444 | 0103 | 3032 | 1110 | 3033 | 5260 | 2033 | 3032 | 1032 | 1221 |
| 2462 | 7500 | 5256 | 7200 | 1033 | 4545 | 1032 | 1110 | 4545 | 5650 | 0230 |
| 2474 | 1105 | 7041 | 1066 | 7450 | 1343 | 1076 | 7450 | 5746 | 1344 | 3071 |
| 2506 | 1071 | 0345 | 1347 | 7440 | 1345 | 7650 | 5323 | 1071 | 0117 | 7440 |
| 2520 | 4326 | 6201 | 5673 | 1117 | 4326 | 5315 | 2521 | 2062 | 5350 | 1061 |
| 2532 | 3410 | 3061 | 1031 | 7141 | 1005 | 1010 | 7620 | 5726 | 4562 | 0040 |
| 2544 | 0377 | 0140 | 3004 | 7640 | 4553 | 3061 | 7040 | 3062 | 5726 | 5751 |
| 2556 | 0000 | 6151 | 5357 | 7300 | 5756 | 0160 | 4152 | 2560 | 4230 | 0140 |
| 2570 | 3000 | 0040 | 6334 | 4131 | 7640 | 6167 | 0377 | 7524 | 0000 | 1000 |
| 2602 | 7575 | 3200 | 6004 | 3201 | 6041 | 5225 | 6042 | 3016 | 1664 | 7450 |
| 2614 | 5225 | 6044 | 3016 | 3664 | 1264 | 7001 | 0104 | 1262 | 3264 | 6031 |
| 2626 | 5255 | 6034 | 6030 | 0103 | 7450 | 5255 | 1120 | 3037 | 1037 | 1202 |
| 2640 | 7650 | 5252 | 1034 | 7640 | 5247 | 1037 | 3034 | 6300 | 7410 | 4562 |
| 2652 | 6300 | 7410 | 5340 | 1201 | 6005 | 7200 | 1200 | 5400 | 3120 | 3124 |
| 2664 | 3124 | 0252 | 2157 | 1034 | 7550 | 5267 | 3276 | 3034 | 1276 | 5666 |
| 2676 | 3325 | 3265 | 6001 | 1663 | 7640 | 5301 | 6002 | 1016 | 7640 | 5314 |
| 2710 | 1265 | 6046 | 3016 | 5323 | 1265 | 3663 | 1263 | 7001 | 0104 | 1262 |
| 2722 | 3263 | 6001 | 5676 | 5472 | 1021 | 7240 | 1326 | 3067 | 6001 | 1016 |
| 2734 | 7640 | 5333 | 6002 | 5342 | 1120 | 3067 | 2016 | 1102 | 3057 | 7040 |
| 2746 | 1262 | 3010 | 6201 | 3410 | 2057 | 5351 | 3034 | 1262 | 3264 | 1262 |
| 2760 | 3263 | 7040 | 6046 | 1076 | 4545 | 4547 | 2022 | 1422 | 7450 | 5377 |
| 2772 | 3067 | 1076 | 4545 | 4545 | 4547 | 1074 | 4545 | 1123 | 3146 | 5177 |
| 3004 | 1062 | 7640 | 5214 | 1010 | 7041 | 1027 | 7700 | 5641 | 1251 | 4545 |
| 3016 | 1010 | 3071 | 6201 | 2062 | 5242 | 1471 | 0117 | 1100 | 7640 | 5237 |
| 3030 | 7040 | 3062 | 7040 | 1010 | 3010 | 1471 | 0076 | 3061 | 5641 | 2521 |
| 3042 | 1471 | 0076 | 1006 | 7640 | 5230 | 3471 | 5231 | 0334 | 1031 | 3030 |
| 3054 | 1035 | 7161 | 1030 | 7620 | 5535 | 1430 | 3316 | 1315 | 3017 | 3020 |
| 3066 | 4541 | 4545 | 4541 | 4545 | 4541 | 4545 | 2030 | 1430 | 4714 | 4541 |

3,833,796

| | 21 | | | | | | | | 22 | |
|---|---|---|---|---|---|---|---|---|---|---|
| 3100 | 4545 | 2030 | 4407 | 0430 | 0000 | 4525 | 1074 | 4545 | 1070 | 1106 |
| 3112 | 1030 | 5253 | 2450 | 3115 | 0000 | 5051 | 0000 | 0000 | 0000 | 0000 |
| 3124 | 0000 | 0000 | 0000 | 0000 | 0000 | 0000 | 0000 | 0000 | 0000 | 0000 |
| 3136 | 0000 | 0000 | 3664 | 0000 | 0355 | 0617 | 0301 | 1423 | 5664 | 1340 |
| 3150 | 6161 | 5767 | 6040 | 7715 | 0000 | 1114 | 3364 | 5754 | 0000 | 2364 |
| 3162 | 5754 | 5760 | 0000 | 7001 | 1010 | 3013 | 1374 | 4536 | 5773 | 0616 |
| 3174 | 0272 | 3175 | 0000 | 0000 | 0000 | 0000 | 0000 | 0000 | 0000 | 0000 |
| 3206 | 0000 | 0000 | 0000 | 0000 | 0000 | 0000 | 0000 | 4217 | 5532 | 0000 |
| 3220 | 3046 | 3045 | 1225 | 3044 | 5617 | 0027 | 4453 | 7200 | 5532 | 0000 |
| 3232 | 4543 | 1402 | 1637 | 4541 | 5232 | 4541 | 4554 | 5631 | 3237 | 2725 |
| 3244 | 2725 | 2725 | 1066 | 1107 | 7650 | 5675 | 4534 | 1613 | 4407 | 6304 |
| 3256 | 0000 | 4453 | 4553 | 7004 | 3067 | 4451 | 4407 | 1304 | 4277 | 1301 |
| 3270 | 0000 | 4453 | 1067 | 3067 | 5676 | 0321 | 0345 | 0007 | 3100 | 0000 |
| 3302 | 2000 | 0000 | 0000 | 0000 | 0000 | 0212 | 7450 | 1066 | 1113 | 7450 |
| 3314 | 5357 | 1346 | 7450 | 5327 | 1350 | 7450 | 5361 | 1347 | 4463 | 7300 |
| 3326 | 5707 | 1351 | 3337 | 1737 | 2337 | 7510 | 5325 | 4463 | 5331 | 3360 |
| 3340 | 1074 | 4463 | 1345 | 4463 | 5737 | 0212 | 0002 | 0225 | 7766 | 3363 |
| 3352 | 3353 | 0336 | 0325 | 0215 | 0212 | 4337 | 5707 | 1352 | 5330 | 0213 |
| 3364 | 0373 | 0336 | 0313 | 0215 | 0212 | 0240 | 0240 | 0240 | 0240 | 0240 |
| 3376 | 0240 | 7777 | 4407 | 6274 | 0000 | 1045 | 7710 | 4562 | 1044 | 7510 |
| 3410 | 7020 | 7010 | 3270 | 7430 | 2270 | 7000 | 1267 | 3271 | 3272 | 3273 |
| 3422 | 1275 | 7450 | 1276 | 7650 | 5265 | 4407 | 0274 | 3270 | 1270 | 0000 |
| 3434 | 7240 | 1044 | 3044 | 1044 | 7041 | 1270 | 7640 | 5261 | 1045 | 7041 |
| 3446 | 1271 | 7640 | 5261 | 1046 | 7041 | 1272 | 7500 | 7041 | 7001 | 7700 |
| 3460 | 5532 | 4407 | 6270 | 0000 | 5227 | 3044 | 5532 | 3015 | 0000 | 0000 |
| 3472 | 0000 | 0000 | 0000 | 0000 | 0000 | 2160 | 7604 | 3315 | 1715 | 7421 |
| 3504 | 7200 | 1034 | 7550 | 5300 | 3315 | 6032 | 3034 | 1315 | 5677 | 0200 |
| 3516 | 1354 | 6302 | 6305 | 6301 | 5321 | 6307 | 7510 | 7200 | 3352 | 6306 |
| 3530 | 7510 | 7200 | 4753 | 1046 | 1355 | 7710 | 5532 | 4164 | 1352 | 1356 |
| 3542 | 2046 | 7500 | 5341 | 4451 | 5532 | 1352 | 5751 | 3215 | 0000 | 3217 |
| 3554 | 0400 | 5044 | 7470 | 4453 | 7041 | 3047 | 4776 | 1101 | 3014 | 1501 |
| 3566 | 3041 | 1414 | 1047 | 7650 | 2046 | 2041 | 5367 | 5532 | 3217 | 0006 |
| 3600 | 3217 | 4634 | 4453 | 7200 | 1061 | 1235 | 7450 | 5214 | 1236 | 7640 |
| 3612 | 5231 | 7410 | 1240 | 1237 | 1046 | 3046 | 1446 | 4600 | 4407 | 7000 |
| 3624 | 6261 | 0000 | 1260 | 3030 | 5535 | 1046 | 5633 | 1443 | 2050 | 5600 |
| 3636 | 0600 | 7600 | 0063 | 4453 | 1240 | 7410 | 4453 | 1237 | 4536 | 4534 |
| 3650 | 2422 | 4562 | 4563 | 3257 | 4453 | 3657 | 5532 | 0000 | 3661 | 0027 |
| 3662 | 0000 | 0000 | 3717 | 0212 | 0440 | 6260 | 5664 | 7323 | 4002 | 7561 |
| 3674 | 5665 | 7324 | 4042 | 2022 | 0523 | 2340 | 2205 | 0454 | 4046 | 4002 |
| 3706 | 0507 | 1116 | 4273 | 0440 | 6260 | 7307 | 4061 | 5671 | 7715 | 3746 |
| 3720 | 0236 | 2340 | 0275 | 6156 | 6365 | 7311 | 4050 | 6471 | 5516 | 5161 |
| 3732 | 5664 | 6573 | 1140 | 5016 | 5561 | 5161 | 5664 | 6573 | 0740 | 6156 |
| 3744 | 7177 | 1500 | 4013 | 0243 | 0440 | 6773 | 2340 | 2375 | 3073 | 2340 |
| 3756 | 1275 | 3173 | 2440 | 4562 | 5416 | 5445 | 6554 | 3054 | 3154 | 4240 |
| 3770 | 4040 | 4273 | 1140 | 5006 | 1450 | 1654 | 6051 | 5177 | 1323 | 4002 |
| 4002 | 7561 | 5664 | 7323 | 4013 | 7560 | 7307 | 4061 | 5671 | 7715 | 4043 |
| 4014 | 0250 | 1140 | 5063 | 5513 | 5161 | 5665 | 7323 | 4013 | 7513 | 5361 |
| 4026 | 7323 | 4026 | 5013 | 5175 | 6073 | 2340 | 0275 | 6156 | 6773 | 0740 |
| 4040 | 6156 | 7077 | 1500 | 4060 | 0255 | 2440 | 4216 | 7542 | 5445 | 6254 |
| 4052 | 1654 | 4255 | 0522 | 2217 | 2256 | 7715 | 4076 | 0262 | 2440 | 4240 |
| 4064 | 1605 | 3024 | 4024 | 0123 | 1337 | 4273 | 0740 | 6156 | 7177 | 1500 |
| 4076 | 4103 | 0306 | 0440 | 7177 | 1500 | 4114 | 0320 | 2340 | 2175 | 3073 |
| 4110 | 2340 | 2475 | 3177 | 1500 | 4153 | 0332 | 2340 | 3075 | 0630 | 5051 |
| 4122 | 7304 | 4067 | 7323 | 4031 | 7506 | 3150 | 5173 | 1140 | 5031 | 5154 |
| 4134 | 6156 | 6573 | 1140 | 5055 | 3051 | 0254 | 6156 | 6573 | 0440 | 5061 |
| 4146 | 6055 | 3051 | 7307 | 4002 | 7715 | 4204 | 0412 | 2340 | 1575 | 6073 |

| | 23 | | | | | | 24 | | | |
|---|---|---|---|---|---|---|---|---|---|---|
| 4160 | 2340 | 2375 | 6073 | 0640 | 1175 | 6154 | 1673 | 2340 | 2375 | 2353 |
| 4172 | 1450 | 1151 | 7317 | 4050 | 1555 | 1450 | 1151 | 5162 | 5670 | 7715 |
| 4204 | 4241 | 0436 | 0640 | 1175 | 6154 | 1673 | 0440 | 6260 | 7324 | 4045 |
| 4216 | 6254 | 1154 | 4566 | 5660 | 6354 | 2250 | 1151 | 5761 | 6060 | 6054 |
| 4230 | 4565 | 5660 | 6154 | 6160 | 6052 | 1450 | 1151 | 5715 | 7715 | 4264 |
| 4242 | 0450 | 1140 | 5065 | 6355 | 0351 | 6256 | 6465 | 5462 | 5664 | 6573 |
| 4254 | 0640 | 1175 | 0354 | 6562 | 7304 | 4062 | 6077 | 1500 | 4270 | 0455 |
| 4266 | 2277 | 1500 | 4277 | 0520 | 2340 | 1575 | 1450 | 1151 | 7715 | 4312 |
| 4300 | 1212 | 1140 | 5006 | 1450 | 6054 | 6460 | 7166 | 5516 | 5151 | 7715 |
| 4312 | 4347 | 1224 | 0640 | 1175 | 6154 | 1673 | 2340 | 2175 | 0614 | 5011 |
| 4324 | 5465 | 6052 | 0611 | 5064 | 6055 | 6460 | 5214 | 5011 | 5157 | 1551 |
| 4336 | 5306 | 1150 | 2250 | 1151 | 5761 | 6055 | 6471 | 5151 | 7715 | 4424 |
| 4350 | 1250 | 0440 | 6260 | 5664 | 7304 | 4065 | 5666 | 6473 | 0640 | 1575 |
| 4362 | 6054 | 6371 | 7324 | 4041 | 5445 | 6456 | 6061 | 5461 | 6060 | 5562 |
| 4374 | 5665 | 5215 | 7323 | 4012 | 7560 | 7306 | 4024 | 7560 | 5464 | 7177 |
| 4406 | 1317 | 4050 | 5506 | 0350 | 1552 | 6560 | 5324 | 5151 | 6673 | 2340 |
| 4420 | 1275 | 1253 | 6177 | 1500 | 4450 | 1300 | 2440 | 4154 | 4240 | 4040 |
| 4432 | 4040 | 4042 | 7306 | 4024 | 7561 | 5465 | 7324 | 4042 | 3655 | 5555 |
| 4444 | 5555 | 5555 | 5555 | 7715 | 4500 | 1301 | 2440 | 4236 | 4254 | 4173 |
| 4456 | 0640 | 2475 | 5665 | 5456 | 6154 | 6173 | 2440 | 4562 | 5660 | 6254 |
| 4470 | 4240 | 4040 | 4040 | 4254 | 2454 | 4240 | 4042 | 7715 | 4521 | 1412 |
| 4502 | 1740 | 5055 | 1251 | 6656 | 6273 | 2440 | 4561 | 5406 | 0350 | 1552 |
| 4514 | 6560 | 5324 | 5173 | 2277 | 1500 | 4534 | 1424 | 0640 | 1275 | 5512 |
| 4526 | 5561 | 5455 | 6173 | 2440 | 4240 | 7715 | 4542 | 1612 | 2440 | 4277 |
| 4540 | 0742 | 7715 | 4605 | 2212 | 1140 | 5006 | 2150 | 5023 | 5530 | 5136 |
| 4552 | 6253 | 5012 | 5531 | 5136 | 6251 | 5570 | 5171 | 5662 | 7713 | 2340 |
| 4564 | 2650 | 1351 | 7526 | 5013 | 5153 | 0621 | 5050 | 3055 | 2151 | 3662 |
| 4576 | 5350 | 3155 | 2451 | 3662 | 5173 | 2277 | 1500 | 4664 | 2224 | 0440 |
| 4610 | 6773 | 2340 | 2650 | 1351 | 7526 | 5013 | 5153 | 0621 | 5050 | 2355 |
| 4622 | 2151 | 3662 | 5350 | 1255 | 2451 | 3662 | 5173 | 2440 | 4565 | 5426 |
| 4634 | 5013 | 5173 | 2340 | 0275 | 6156 | 6477 | 1311 | 4050 | 0614 | 5016 |
| 4646 | 5414 | 5016 | 5153 | 2650 | 1351 | 5151 | 7311 | 4050 | 6355 | 1351 |
| 4660 | 7156 | 6373 | 2277 | 1500 | 4701 | 2236 | 2440 | 1450 | 1651 | 5442 |
| 4672 | 4040 | 4016 | 0530 | 2440 | 2401 | 2313 | 7715 | 4720 | 2601 | 1140 |
| 4704 | 5016 | 5561 | 5161 | 6156 | 6173 | 0440 | 6164 | 7323 | 4015 | 7515 |
| 4716 | 5561 | 7715 | 4744 | 2612 | 2440 | 4216 | 1756 | 4273 | 0140 | 1673 |
| 4730 | 1740 | 5015 | 5516 | 5161 | 6156 | 6273 | 2340 | 0275 | 6156 | 6373 |
| 4742 | 2277 | 1500 | 4752 | 2624 | 2340 | 1575 | 1677 | 1500 | 4757 | 3001 |
| 4754 | 0440 | 6164 | 7715 | 4770 | 3012 | 0640 | 1175 | 6154 | 6473 | 0440 |
| 4766 | 6260 | 7715 | 5015 | 3024 | 2340 | 1675 | 1555 | 6173 | 0440 | 6273 |
| 5000 | 0440 | 6573 | 2340 | 0275 | 6156 | 6173 | 2340 | 0375 | 6463 | 7304 |
| 5012 | 4062 | 5664 | 7715 | 5031 | 3212 | 2340 | 2375 | 6073 | 2340 | 1575 |
| 5024 | 6073 | 2340 | 1675 | 6077 | 1500 | 5042 | 3224 | 0640 | 1175 | 6154 |
| 5036 | 6473 | 0440 | 6777 | 1500 | 5053 | 3236 | 0440 | 6260 | 7304 | 4061 |
| 5050 | 6456 | 6477 | 1500 | 5116 | 3424 | 1140 | 5065 | 6060 | 5506 | 2250 |
| 5062 | 1654 | 6160 | 6060 | 5250 | 2650 | 6151 | 5326 | 5062 | 5151 | 5714 |
| 5074 | 5016 | 5151 | 5161 | 6456 | 6473 | 1140 | 5006 | 2250 | 1654 | 6160 |
| 5106 | 6060 | 5522 | 5016 | 5151 | 5161 | 6456 | 6577 | 1500 | 5134 | 3450 |
| 5120 | 2340 | 1575 | 1553 | 6173 | 2340 | 1675 | 1573 | 2340 | 0275 | 6156 |
| 5132 | 6377 | 1500 | 5146 | 3455 | 2440 | 4240 | 1713 | 4273 | 0440 | 6260 |
| 5144 | 7322 | 7715 | 5157 | 3462 | 0440 | 6156 | 6465 | 7304 | 4061 | 6677 |
| 5156 | 1500 | 5170 | 3612 | 0440 | 6260 | 7323 | 4002 | 7561 | 5663 | 7715 |
| 5170 | 5231 | 4012 | 0440 | 6260 | 7324 | 4045 | 6254 | 1654 | 4565 | 5423 |
| 5202 | 5412 | 5442 | 4040 | 4040 | 4273 | 1140 | 5013 | 5561 | 5154 | 6166 |
| 5214 | 5663 | 7713 | 0640 | 1175 | 6154 | 1355 | 6173 | 2440 | 4565 | 5426 |
| 5226 | 5011 | 5177 | 1500 | 5253 | 4036 | 2340 | 0275 | 6156 | 7073 | 0440 |

| | | | | | | | | | | |
|---|---|---|---|---|---|---|---|---|---|---|
| 5240 | 6156 | 7173 | 2340 | 1375 | 1355 | 6173 | 2340 | 0275 | 6156 | 6477 |
| 5252 | 1500 | 5260 | 4201 | 0440 | 6166 | 7715 | 5265 | 4412 | 0440 | 6166 |
| 5264 | 7715 | 5272 | 4612 | 0440 | 6166 | 7715 | 5312 | 5012 | 2440 | 4173 |
| 5276 | 2340 | 0375 | 0353 | 6173 | 1140 | 5065 | 6355 | 0351 | 6260 | 5664 |
| 5310 | 7322 | 7715 | 0000 | 5050 | 2440 | 4141 | 4141 | 4255 | 5542 | 4141 |
| 5322 | 4141 | 4141 | 4141 | 4173 | 2340 | 0375 | 6077 | 1500 | 6077 | 7715 |
| 5334 | 7715 | 0755 | 0272 | 4367 | 1364 | 0000 | 1360 | 1044 | 3044 | 2033 |
| 5346 | 5524 | 4407 | 6755 | 0364 | 3755 | 0000 | 5524 | 5537 | 5542 | 5533 |
| 5360 | 0000 | 7776 | 2520 | 5224 | 0001 | 2000 | 0000 | 0002 | 2000 | 0000 |
| 5372 | 4613 | 5550 | 5545 | 5553 | 5561 | 5556 | 6100 | 3334 | 1052 | 4551 |
| 5404 | 0115 | 3032 | 1032 | 7041 | 7450 | 1326 | 3335 | 1052 | 7450 | 5241 |
| 5416 | 0115 | 3333 | 1335 | 1333 | 7510 | 5230 | 7240 | 1032 | 3333 | 7040 |
| 5430 | 1033 | 7500 | 7200 | 1032 | 7510 | 5263 | 1326 | 7500 | 7200 | 1327 |
| 5442 | 3071 | 1731 | 1071 | 3336 | 1071 | 7041 | 3071 | 1325 | 2736 | 1736 |
| 5454 | 1330 | 7710 | 5265 | 3736 | 2071 | 5321 | 2736 | 2033 | 7200 | 1052 |
| 5466 | 7650 | 5356 | 1335 | 1033 | 7540 | 5355 | 1333 | 7500 | 7200 | 7041 |
| 5500 | 1033 | 7041 | 3032 | 1033 | 1032 | 7650 | 5343 | 1032 | 7001 | 7710 |
| 5512 | 1100 | 4336 | 2032 | 5303 | 1075 | 4543 | 5303 | 7040 | 1336 | 3336 |
| 5524 | 5252 | 0005 | 7772 | 0007 | 7766 | 6150 | 6154 | 0004 | 7776 | 0000 |
| 5536 | 5514 | 4732 | 2335 | 5736 | 5600 | 7040 | 1033 | 3033 | 2334 | 5353 |
| 5550 | 7040 | 3334 | 5313 | 1414 | 5313 | 7200 | 4732 | 1075 | 4543 | 2200 |
| 5562 | 1414 | 4336 | 2334 | 5362 | 7040 | 3334 | 5363 | 6011 | 1045 | 3050 |
| 5574 | 1045 | 7710 | 4451 | 5771 | 0000 | 3334 | 1052 | 4553 | 0117 | 3032 |
| 5606 | 1032 | 7041 | 7450 | 1326 | 3335 | 1052 | 7450 | 5241 | 0117 | 3333 |
| 5620 | 1335 | 1333 | 7510 | 5230 | 7240 | 1032 | 3333 | 7040 | 1033 | 7500 |
| 5632 | 7200 | 1032 | 7510 | 5263 | 1326 | 7500 | 7200 | 1327 | 3071 | 1731 |
| 5644 | 1071 | 3336 | 1071 | 7041 | 3071 | 1325 | 2736 | 1736 | 1330 | 7710 |
| 5656 | 5265 | 3736 | 2071 | 5321 | 2736 | 2033 | 7200 | 1052 | 7650 | 5356 |
| 5670 | 1335 | 1033 | 7540 | 5355 | 1333 | 7500 | 7200 | 7041 | 1033 | 7041 |
| 5702 | 3032 | 1033 | 1032 | 7650 | 5343 | 1032 | 7001 | 7710 | 1102 | 4336 |
| 5714 | 2032 | 5303 | 1077 | 4545 | 5303 | 7040 | 1336 | 3336 | 5252 | 0005 |
| 5726 | 7772 | 0007 | 7766 | 6350 | 6354 | 0000 | 0000 | 0000 | 0000 | 4732 |
| 5740 | 2335 | 5736 | 5600 | 7040 | 1033 | 3033 | 2334 | 5353 | 7040 | 3334 |
| 5752 | 5313 | 1414 | 5313 | 7200 | 4732 | 1077 | 4545 | 2200 | 1414 | 4336 |
| 5764 | 2334 | 5362 | 7040 | 3334 | 5363 | 0000 | 1045 | 3050 | 1045 | 7710 |
| 5776 | 4451 | 5771 | 0311 | 3046 | 3044 | 3045 | 3047 | 3314 | 3050 | 1066 |
| 6010 | 1264 | 7450 | 5220 | 1106 | 7640 | 5221 | 7040 | 3050 | 4666 | 1066 |
| 6022 | 1265 | 7650 | 5220 | 4227 | 5600 | 6026 | 1066 | 1262 | 7650 | 5627 |
| 6034 | 4555 | 5627 | 5247 | 1054 | 3313 | 4267 | 2314 | 7640 | 4562 | 4666 |
| 6046 | 5230 | 1066 | 1107 | 7710 | 5627 | 1066 | 1263 | 7740 | 5627 | 1066 |
| 6060 | 0117 | 5240 | 7473 | 7446 | 7525 | 7540 | 0764 | 6042 | 1047 | 3043 |
| 6072 | 1046 | 3042 | 1045 | 3041 | 3312 | 4315 | 4315 | 4333 | 4315 | 1313 |
| 6104 | 3043 | 3042 | 3041 | 4333 | 1312 | 5667 | 0000 | 0000 | 0002 | 6103 |
| 6116 | 1047 | 7104 | 3047 | 1046 | 7004 | 3046 | 1045 | 7004 | 3045 | 1312 |
| 6130 | 7004 | 3312 | 5715 | 6110 | 7300 | 1047 | 1043 | 3047 | 7004 | 1046 |
| 6142 | 1042 | 3046 | 7004 | 1045 | 1041 | 3045 | 7004 | 1312 | 3312 | 5733 |
| 6154 | 0000 | 7300 | 1041 | 7510 | 7120 | 7010 | 3041 | 1042 | 7010 | 3042 |
| 6166 | 1043 | 7010 | 3043 | 2040 | 5754 | 5754 | 7446 | 7473 | 7540 | 7525 |
| 6200 | 0000 | 7200 | 7200 | 1045 | 7700 | 5210 | 1336 | 4545 | 4753 | 3033 |
| 6212 | 1044 | 7510 | 5227 | 7440 | 1341 | 7750 | 5234 | 4407 | 4744 | 0000 |
| 6224 | 7001 | 1033 | 5211 | 4407 | 4752 | 0000 | 7040 | 5225 | 3745 | 3746 |
| 6236 | 1350 | 3014 | 1044 | 7140 | 3354 | 1343 | 3044 | 4524 | 2354 | 5245 |
| 6250 | 1746 | 7450 | 5270 | 1342 | 7710 | 5264 | 7001 | 3414 | 2044 | 1342 |
| 6262 | 2033 | 7000 | 1746 | 2033 | 7000 | 7410 | 4747 | 3414 | 2044 | 5270 |
| 6274 | 1350 | 3014 | 1343 | 4751 | 5600 | 1333 | 4545 | 1033 | 7510 | 7041 |
| 6306 | 3045 | 1033 | 7700 | 1106 | 1336 | 4545 | 1045 | 2044 | 1337 | 7500 |

| | | | | | | | | | | |
|---|---|---|---|---|---|---|---|---|---|---|
| 6320 | 5315 | 1340 | 3045 | 7040 | 1044 | 7440 | 4354 | 1045 | 4732 | 5600 |
| 6332 | 2450 | 0305 | 7763 | 0275 | 0255 | 7634 | 0144 | 7774 | 7766 | 7771 |
| 6344 | 6475 | 6113 | 6112 | 6067 | 3174 | 5600 | 6471 | 5771 | 0000 | 1110 |
| 6356 | 4545 | 5754 | 0101 | 7450 | 5312 | 1116 | 3066 | 4770 | 5312 | 5711 |
| 6370 | 4477 | 0000 | 4557 | 4134 | 7774 | 5565 | 0255 | 7763 | 0000 | 7640 |
| 6402 | 4706 | 1066 | 1111 | 7650 | 5202 | 4702 | 1066 | 1112 | 7640 | 5221 |
| 6414 | 4706 | 3705 | 4703 | 1705 | 7041 | 3033 | 1310 | 3044 | 4704 | 4707 |
| 6426 | 4407 | 6430 | 0000 | 1066 | 1301 | 7640 | 5246 | 4706 | 4702 | 4704 |
| 6440 | 1047 | 1033 | 3033 | 4407 | 0430 | 0000 | 1033 | 7450 | 5600 | 7700 |
| 6452 | 5261 | 4407 | 4275 | 6430 | 0000 | 7001 | 5266 | 4407 | 4271 | 6430 |
| 6464 | 0000 | 7040 | 1033 | 3033 | 5246 | 0004 | 2400 | 0000 | 0000 | 7775 |
| 6476 | 3146 | 3147 | 3150 | 7473 | 6000 | 6027 | 7373 | 6114 | 0764 | 7535 |
| 6510 | 0043 | 7240 | 3314 | 5727 | 0000 | 2314 | 5726 | 4550 | 4544 | 1403 |
| 6522 | 5725 | 4541 | 5320 | 0423 | 0610 | 1024 | 0214 | 0207 | 0203 | 0337 |
| 6534 | 0212 | 0215 | 0001 | 7777 | 2726 | 1012 | 3740 | 5744 | 2727 | 0045 |
| 6546 | 2166 | 2363 | 5746 | 1066 | 1364 | 7640 | 5357 | 1365 | 5361 | 2346 |
| 6560 | 7240 | 3363 | 5746 | 7777 | 7405 | 7766 | 7004 | 7335 | 6623 | 5754 |
| 6572 | 6757 | 5733 | 6506 | 6505 | 7107 | 6563 | 0000 | 7300 | 3047 | 3043 |
| 6604 | 1600 | 7450 | 5600 | 3262 | 1262 | 0120 | 7650 | 5216 | 1101 | 0200 |
| 6616 | 3040 | 1103 | 0262 | 1040 | 3040 | 1263 | 0262 | 7650 | 5231 | 1440 |
| 6630 | 3040 | 2200 | 7040 | 1040 | 3015 | 1262 | 7106 | 7006 | 0104 | 7450 |
| 6642 | 5267 | 1264 | 3262 | 1662 | 7450 | 5265 | 3262 | 1304 | 3014 | 1114 |
| 6654 | 3057 | 1415 | 3414 | 2057 | 5255 | 5662 | 0000 | 0400 | 6773 | 1303 |
| 6666 | 5273 | 1303 | 3015 | 7040 | 1040 | 3014 | 1114 | 3057 | 1414 | 3415 |
| 6700 | 2057 | 5276 | 5201 | 0043 | 0037 | 4765 | 4770 | 5201 | 4772 | 4771 |
| 6712 | 4773 | 4767 | 5201 | 1045 | 7640 | 5325 | 3044 | 3045 | 3046 | 3047 |
| 6724 | 5201 | 4537 | 0044 | 4537 | 0040 | 4540 | 0044 | 4453 | 7510 | 5342 |
| 6736 | 7040 | 3262 | 3043 | 1045 | 7640 | 4562 | 4537 | 2413 | 4540 | 0044 |
| 6750 | 4540 | 3175 | 5360 | 4537 | 3175 | 4540 | 0040 | 4766 | 2262 | 5353 |
| 6762 | 5201 | 4766 | 5201 | 7353 | 7204 | 7535 | 7023 | 6154 | 7157 | 6133 |
| 6774 | 6706 | 6705 | 7307 | 6763 | 6715 | 0000 | 6713 | 0000 | 7300 | 1047 |
| 7006 | 7041 | 3047 | 1046 | 7040 | 7430 | 7101 | 3046 | 1045 | 7040 | 7430 |
| 7020 | 7101 | 3045 | 5603 | 0000 | 1045 | 7450 | 1046 | 7650 | 5311 | 1041 |
| 7032 | 7450 | 1042 | 7450 | 1043 | 7650 | 5623 | 1040 | 7041 | 1044 | 7450 |
| 7044 | 5273 | 3203 | 1203 | 7500 | 7041 | 3322 | 1322 | 1336 | 7710 | 5275 |
| 7056 | 1203 | 7700 | 5265 | 4357 | 2322 | 5261 | 5273 | 7040 | 1040 | 3040 |
| 7070 | 4723 | 2322 | 5270 | 2223 | 5623 | 1040 | 7700 | 5304 | 1044 | 7700 |
| 7102 | 5623 | 5306 | 1044 | 7700 | 1203 | 7740 | 5623 | 1040 | 3044 | 1041 |
| 7114 | 3045 | 1042 | 3046 | 1043 | 3047 | 5623 | 0000 | 6154 | 0000 | 4751 |
| 7126 | 1044 | 7750 | 5353 | 7001 | 3043 | 1350 | 3040 | 4223 | 0027 | 2047 |
| 7140 | 5344 | 2046 | 7410 | 2045 | 3047 | 4752 | 1046 | 5724 | 0027 | 5771 |
| 7152 | 7373 | 3044 | 3045 | 3046 | 5344 | 0000 | 7300 | 1045 | 7510 | 7020 |
| 7164 | 7010 | 3045 | 1046 | 7010 | 3046 | 1047 | 7010 | 3047 | 2044 | 5757 |
| 7176 | 5757 | 0337 | 0377 | 0212 | 0375 | 7777 | 0000 | 7001 | 1040 | 4324 |
| 7210 | 7710 | 4353 | 3301 | 3300 | 3277 | 3276 | 1045 | 3751 | 1041 | 4752 |
| 7222 | 0002 | 1042 | 4752 | 0003 | 1046 | 3751 | 1041 | 4752 | 0003 | 1042 |
| 7234 | 4752 | 0004 | 5263 | 3274 | 1043 | 3751 | 1045 | 4752 | 0004 | 1046 |
| 7246 | 4752 | 0005 | 1047 | 3751 | 1041 | 4752 | 0004 | 1042 | 4752 | 0005 |
| 7260 | 1043 | 4752 | 0006 | 1301 | 3045 | 1300 | 3046 | 1277 | 3047 | 4301 |
| 7272 | 3047 | 5604 | 7004 | 1045 | 1041 | 7420 | 5304 | 0000 | 2050 | 4451 |
| 7304 | 4747 | 2047 | 5701 | 1041 | 7650 | 4562 | 1040 | 7041 | 7001 | 4324 |
| 7316 | 7700 | 4353 | 4750 | 4301 | 5723 | 6601 | 0000 | 1044 | 3044 | 1121 |
| 7330 | 0045 | 1041 | 7700 | 7040 | 3050 | 1045 | 7450 | 5746 | 7710 | 4451 |
| 7342 | 1041 | 7450 | 5746 | 5724 | 6720 | 7535 | 7461 | 7456 | 7400 | 0000 |
| 7354 | 7300 | 1043 | 7041 | 3043 | 1042 | 7040 | 7430 | 7101 | 3042 | 1041 |
| 7366 | 7040 | 7430 | 7101 | 3041 | 5753 | 0000 | 1050 | 7710 | 4451 | 5773 |

| | | | | | | | | | | |
|---|---|---|---|---|---|---|---|---|---|---|
| 7400 | 0000 | 7450 | 5600 | 3254 | 3253 | 1257 | 3255 | 7100 | 1254 | 7010 |
| 7412 | 3254 | 1253 | 7420 | 5220 | 7100 | 1256 | 7010 | 3253 | 2255 | 5210 |
| 7424 | 1254 | 7010 | 3255 | 1600 | 7041 | 1252 | 3254 | 1255 | 7100 | 1654 |
| 7436 | 3654 | 2254 | 7004 | 1253 | 1654 | 3654 | 7420 | 5600 | 2254 | 2654 |
| 7450 | 5600 | 5246 | 7302 | 0000 | 0000 | 0000 | 0000 | 7764 | 7751 | 0000 |
| 7462 | 3200 | 3254 | 1260 | 3255 | 7410 | 4524 | 7100 | 1042 | 1046 | 3256 |
| 7474 | 7004 | 1045 | 1041 | 7420 | 5304 | 3045 | 1256 | 3046 | 7200 | 1254 |
| 7506 | 7004 | 3254 | 1200 | 7004 | 3200 | 2255 | 5267 | 1254 | 3046 | 1200 |
| 7520 | 3045 | 5661 | 7004 | 3335 | 2255 | 5267 | 1335 | 3045 | 1200 | 3046 |
| 7532 | 1254 | 3047 | 5661 | 0000 | 4775 | 4366 | 1045 | 7450 | 1047 | 7450 |
| 7544 | 1046 | 7650 | 5363 | 1045 | 7104 | 7710 | 5360 | 4524 | 7140 | 1044 |
| 7556 | 3044 | 5347 | 4776 | 4366 | 5735 | 3044 | 5735 | 7157 | 0000 | 1045 |
| 7570 | 7510 | 7041 | 7710 | 4765 | 5766 | 5771 | 7373 | 7000 | | |

It is obvious that one skilled in the art may make modifications in the details of construction without departing from the spirit of the invention which is set out in varying scope in the appended claims.

We claim:

1. A method for the automatic characterization of chromosomes, comprising the steps of:
  a. displaying an image of a chromosome;
  b. locating a reference point on said chromosome;
  c. registering the location of said reference point;
  d. advancing an identifying means from the distal end of each of the arms of said chromosome to approximate engagement with said reference point; and
  e. computing the effective length of each of said arms.

2. A method as described in claim 1, including the step of superimposing said identifying means onto said image.

3. A method as described in claim 1, including the step of detecting a plurality of points along said arm.

4. A method as described in claim 3, including the step of recording the location of said points relative to said reference point.

5. A method as described in claim 4, including the step of converting said points into coordinate pairs.

6. A method as described in claim 5, including the step of computing the centromere index for said chromosome.

7. A method as described in claim 6, wherein said image includes a plurality of chromosomes of a particular cell.

8. A method as described in claim 7, including the step of computing the arm ratio and the length ratio of said chromosomes.

9. A method as described in claim 8, including the step of plotting said arm ratio versus said length ratio.

10. A method as described in claim 9, including the step of recording said effective length, said arm ratio, said length ratio, and said centromere index.

11. An apparatus for the automatic characterization of chromosomes, comprising in combination:
  means for displaying an image of a chromosome;
  manual selection means for selective registration with discrete points of said image;
  means for identifying a plurality of points selected by said manual selection means along the length of each of the arms of said chromosomes relative to a reference point on said chromosome; and
  means for computing the effective length of each of said arms from said plurality of points identified with respect to said reference point.

12. An apparatus as described in claim 11 wherein said image is a microscopic image.

13. An apparatus as described in claim 11 wherein said image is a photographic image.

14. An apparatus as described in claim 11 wherein said reference point is the centromere of said chromosome.

* * * * *